United States Patent
Kim et al.

(10) Patent No.: US 10,185,456 B2
(45) Date of Patent: Jan. 22, 2019

(54) DISPLAY DEVICE AND CONTROL METHOD THEREOF

(71) Applicant: Samsung Electronics Co. Ltd., Suwon-si, Gyeonggi-do (KR)

(72) Inventors: Kang-Tae Kim, Yongin-si (KR); Chul-Joo Kim, Suwon-si (KR); Sun-Young Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 444 days.

(21) Appl. No.: 13/690,380

(22) Filed: Nov. 30, 2012

(65) Prior Publication Data

US 2014/0033119 A1    Jan. 30, 2014

(30) Foreign Application Priority Data

Jul. 27, 2012 (KR) .................. 10-2012-0082435

(51) Int. Cl.
*G06F 3/0481* (2013.01)
*G06F 3/0486* (2013.01)
*G06F 3/0488* (2013.01)

(52) U.S. Cl.
CPC .......... *G06F 3/0481* (2013.01); *G06F 3/0486* (2013.01); *G06F 3/04883* (2013.01); *G06F 2203/04808* (2013.01)

(58) Field of Classification Search
CPC ..................... G06F 3/0486; G06F 2203/04803
USPC ....................................................... 715/800
See application file for complete search history.

(56) References Cited

U.S. PATENT DOCUMENTS

| | | | | |
|---|---|---|---|---|
| 5,880,733 A | * | 3/1999 | Horvitz | ............... G06F 3/04815 715/850 |
| 6,075,531 A | * | 6/2000 | DeStefano | ............ G06F 3/0481 715/788 |
| 6,686,852 B1 | | 2/2004 | Guo | |
| 7,773,075 B2 | * | 8/2010 | Otsuka | ............... G01C 21/3664 345/173 |
| 8,271,907 B2 | | 9/2012 | Kim et al. | |
| 2002/0191028 A1 | * | 12/2002 | Senechalle et al. | .......... 345/800 |
| 2003/0076362 A1 | | 4/2003 | Terada | |
| 2004/0056903 A1 | | 3/2004 | Sakai | |
| 2005/0235220 A1 | | 10/2005 | Duperrouzel et al. | |
| 2006/0209040 A1 | | 9/2006 | Garside et al. | |
| 2007/0106955 A1 | * | 5/2007 | Conrad | .................. G06F 3/0481 715/781 |
| 2007/0162865 A1 | * | 7/2007 | Haynes | ................. G06F 3/0481 715/769 |
| 2007/0180400 A1 | * | 8/2007 | Zotov et al. | .................. 715/788 |

(Continued)

FOREIGN PATENT DOCUMENTS

CN    1344989 A    4/2002
CN    1458576 A    11/2003
(Continued)

*Primary Examiner* — Sherrod L Keaton
(74) *Attorney, Agent, or Firm* — Jefferson IP Law, LLP

(57) ABSTRACT

A method of controlling a display device for displaying a window executing an application is provided. The method includes displaying the window, determining whether a window control mode for controlling an operation of the window is executed, determining whether a window control event for controlling the window is input into an internal area of the window, and controlling the window based on the determined window control event.

20 Claims, 25 Drawing Sheets

(56) References Cited

U.S. PATENT DOCUMENTS

| | | |
|---|---|---|
| 2007/0192726 A1 | 8/2007 | Kim et al. |
| 2008/0165141 A1* | 7/2008 | Christie .................. G06F 3/044 345/173 |
| 2008/0172609 A1 | 7/2008 | Rytivaara |
| 2008/0198141 A1 | 8/2008 | Lee et al. |
| 2008/0214239 A1 | 9/2008 | Hashimoto et al. |
| 2008/0320396 A1 | 12/2008 | Mizrachi et al. |
| 2009/0199128 A1* | 8/2009 | Matthews ............. G06F 3/0481 715/799 |
| 2009/0213086 A1 | 8/2009 | Chae et al. |
| 2009/0235203 A1* | 9/2009 | Iizuka ........................... 715/800 |
| 2009/0259964 A1 | 10/2009 | Davidson et al. |
| 2009/0307631 A1 | 12/2009 | Kim et al. |
| 2009/0322690 A1 | 12/2009 | Hiltunen et al. |
| 2010/0062811 A1 | 3/2010 | Park et al. |
| 2010/0088634 A1 | 4/2010 | Tsuruta et al. |
| 2010/0162163 A1 | 6/2010 | Wang et al. |
| 2010/0214278 A1 | 8/2010 | Miura |
| 2010/0248788 A1 | 9/2010 | Yook et al. |
| 2010/0328232 A1 | 12/2010 | Wood |
| 2011/0037720 A1 | 2/2011 | Hirukawa et al. |
| 2012/0071208 A1 | 3/2012 | Lee et al. |
| 2012/0084694 A1* | 4/2012 | Sirpal et al. ................. 715/769 |
| 2012/0127206 A1* | 5/2012 | Thompson ............. G06F 3/038 345/661 |
| 2012/0176322 A1 | 7/2012 | Karmi et al. |
| 2012/0303476 A1 | 11/2012 | Krzyzanowski et al. |
| 2012/0304106 A1* | 11/2012 | LeVee .................. G06F 3/0481 715/781 |
| 2013/0132885 A1* | 5/2013 | Maynard et al. ............. 715/777 |
| 2013/0290887 A1 | 10/2013 | Sun et al. |

FOREIGN PATENT DOCUMENTS

| | | |
|---|---|---|
| CN | 1834887 A | 9/2006 |
| CN | 101352057 A | 1/2009 |
| CN | 102413229 A | 4/2012 |
| JP | 10-260784 A | 9/1998 |
| JP | 2004-46796 A | 2/2004 |
| JP | 2006-073015 A | 3/2006 |
| JP | 2006-115213 A | 4/2006 |
| JP | 2008-117181 A | 5/2008 |
| JP | 2008-134348 A | 6/2008 |
| KR | 10-0478920 B1 | 3/2005 |
| KR | 10-0650257 B1 | 11/2006 |
| KR | 10-0652626 B1 | 11/2006 |
| KR | 10-0700171 B1 | 3/2007 |
| KR | 10-2009-0016044 A | 2/2009 |
| KR | 10-0900295 B1 | 5/2009 |
| KR | 10-2010-0018883 A | 2/2010 |
| KR | 10-2010-0030968 A | 3/2010 |
| KR | 10-2010-0053823 A | 5/2010 |
| KR | 10-2013-0120761 A | 11/2013 |
| WO | 2008/090902 A1 | 7/2008 |
| WO | 2009/017175 A1 | 2/2009 |
| WO | 2009/028892 A2 | 3/2009 |

\* cited by examiner

DISPLAY DEVICE AND CONTROL METHOD THEREOF

PRIORITY

This application claims the benefit under 35 U.S.C. § 119(a) of a Korean patent application filed on Jul. 27, 2012, in the Korean Intellectual Property Office and assigned Serial No. 10-2012-0082435, the entire disclosure of which is hereby incorporated by reference.

BACKGROUND OF THE INVENTION

1. Field of the Invention

The present invention relates to a display device and a control method thereof. More particularly, the present invention relates to a display device including a touch screen and a control method thereof.

2. Description of the Related Art

Currently, dissemination of a smart phone and a tablet Personal Computer (PC) rapidly increases. The smart phone refers to a portable phone that provides a service requiring a large number of operations, similar to a service provided by a PC. A smart phone includes a touch screen and may be operated based on a user's touch input into the touch screen.

The tablet PC is a device that provides function of a general PC and may be used for a graphic user interface. A tablet PC includes a touch screen and may operate based on a user's touch input to the touch screen.

Meanwhile, a desktop computer generally uses Windows as an Operating System (OS). In a Windows environment, a window is displayed on a screen of the desktop computer. The user can change a size of the window by designating a boundary of the window and performing a dragging.

The smart phone and the tablet PC can display a plurality of applications on respective windows. However, the smart phone and the tablet PC include a relatively smaller touch screen in comparison with a monitor of the desktop computer. Accordingly, the user may be limited in performing an input on the touch screen of the smart phone or the tablet PC. Furthermore, a recent smart phone or tablet PC receives an input of activity by a user's finger. The user's finger is in contact with a relatively large area on the touch screen, and as a result, the user cannot accurately designate the boundary of the window. For example, the smart phone and the tablet PC cannot change the window size through a window size changing method of the related art.

Therefore, a need exists for a display device including a touch screen and a control method thereof capable of changing a window size in the display device including the touch screen.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a display device for changing a size and a position of a window based on an event input into an external area of the window and a control method thereof.

In accordance with an aspect of the present invention, a method of controlling a display device for displaying a window executing an application is provided. The method includes displaying the window, determining whether a window control mode for controlling an operation of the window is executed, determining whether a window control event for controlling the window is input into an internal area of the window, and controlling the window based on the determined window control event.

In accordance with another aspect of the present invention, a display device including a touch screen for displaying a window executing an application is provided. The display device includes the touch screen for displaying the window, and a controller for determining whether a window control mode for controlling an operation of the window is executed, for determining whether a window control event for controlling the window is input into an internal area of the window, and for controlling the window based on the determined window control event.

A display device for changing a size and a position of a window may be disclosed in various exemplary embodiments of the present invention. More particularly, a user may change the size and the position of the window in a display device implemented by inputting an event into a touch screen with his/her finger. More specifically, it is possible to achieve various window controls, such as moving a window, resizing a window, minimizing a window size, setting a window size to a defaulted size, and the like, in the display device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
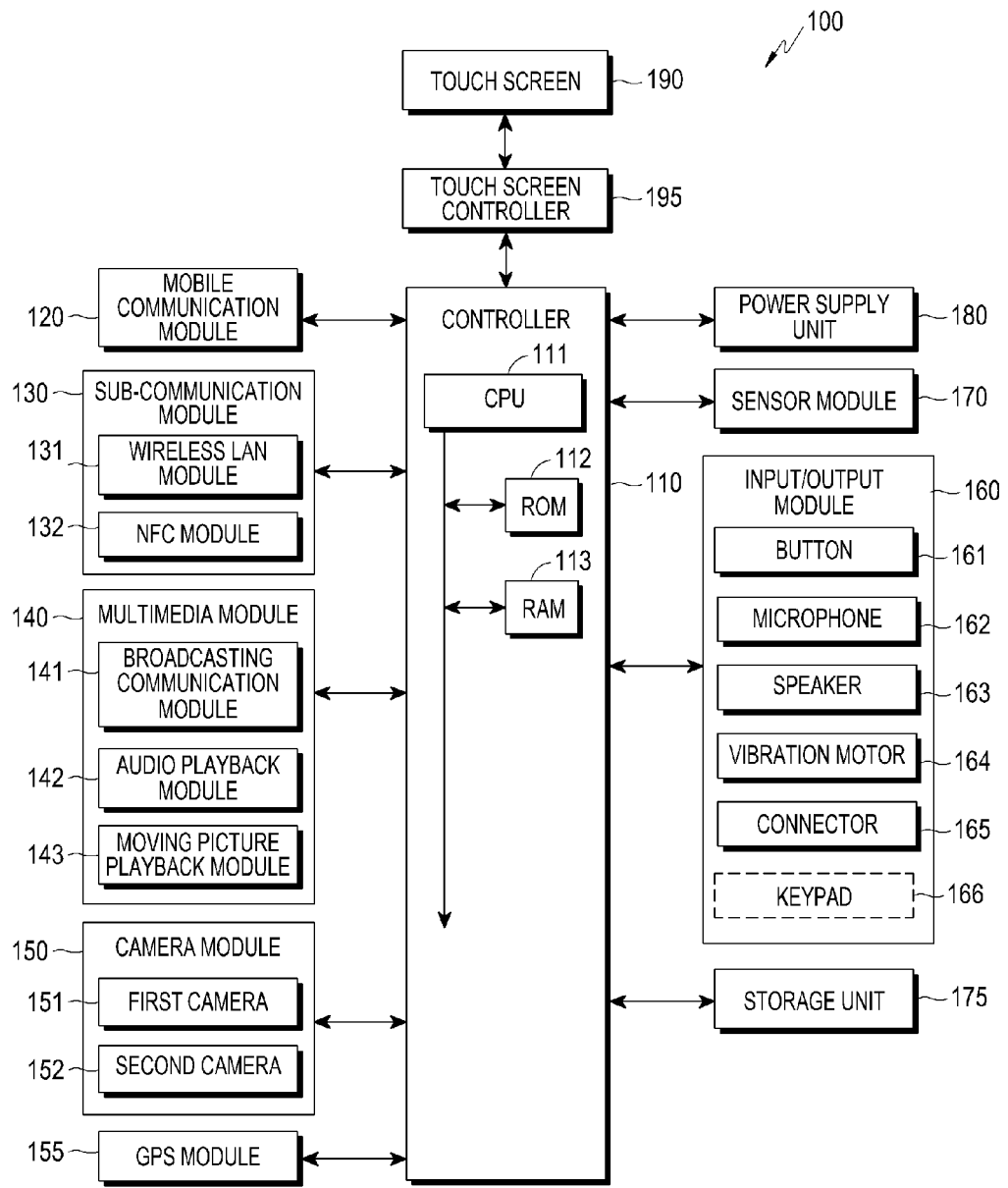
FIG. 1 is a block diagram schematically illustrating a device according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, illustrative exemplary embodiments according to the present invention will be described with reference to descriptions discussed through the accompanying drawings. However, exemplary embodiments of the present invention are not limited or restricted by the illustrative exemplary embodiments. The same reference numerals shown in respective drawings indicate members for substantially performing the same function.

FIGS. 1 through 14C, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a block diagram schematically illustrating a device according to an exemplary embodiment of the present invention.

Referring to FIG. 1, a display device 100 may be connected to an external device (not shown) by using a mobile communication module 120, a sub communication module 130, and a connector 165. The "external device" includes a different device (not shown) from the display device 100, a mobile phone (not shown), a smart phone (not shown), a tablet Personal Computer (PC) (not shown), and a server (not shown).

The display device 100 includes a touch screen 190 and a touch screen controller 195. In addition, the display device 100 includes a controller 110, the mobile communication module 120, the sub communication module 130, a multimedia module 140, a camera module 150, a Global Positioning System (GPS) module 155, an input/output module 160, a sensor module 170, a storage unit 175, and a power supplier 180. The sub communication module 130 includes at least one of a wireless Local Area Network (LAN) module 131 and a near field communication module 132, and the multimedia module 140 includes at least one of a broadcasting communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, the connector 165, and a keypad 166.

The controller 110 may include a Central Processing Unit (CPU) 111, a Read Only Memory (ROM) 112 for storing a control program for controlling the display device 100, and a Random Access Memory (RAM) 113 for storing a signal or data input from an outside of the display device 100 or used as a storage area for an operation performed in the display device 100. The CPU 111 may include a single core, a dual core, a triple core, or a quad core. The CPU 111, the ROM 112, and the RAM 113 may be mutually connected through an external bus.

The controller 110 may control the mobile communication module 120, the sub communication module 130, the multimedia module 140, the camera module 150, the GPS module 155, the input/output module 160, the sensor module 170, the storage unit 175, the power supplier 180, the touch screen 190 which may include a first touch screen and a second touch screen, and the touch screen controller 195.

The mobile communication module 120 connects the display device 100 with the external device through mobile communication by using at least one or a plurality of antennas (not shown) according to a control of the controller 110. The mobile communication module 120 transmits/receives a wireless signal for voice phone communication, video phone communication, a Short Message Service (SMS), or a Multimedia Message Service (MMS) to/from a mobile phone (not shown), a smart phone (not shown), a tablet PC, or another device (not shown) having a phone number input into the display device 100.

The sub communication module 130 may include at least one of the wireless LAN module 131 and the near field communication module 132. For example, the sub communication module 130 may include only the wireless LAN module 131, only the near field communication module 132, or both the wireless LAN module 131 and the near field communication module 132.

The wireless LAN module 131 may be connected to the Internet in a place where a wireless Access Point (AP) (not shown) is installed, according to a control of the controller 110. The wireless LAN module 131 supports a wireless LAN standard (IEEE802.11x) of the Institute of Electrical and Electronics Engineers (IEEE). The near field communication module 132 may wirelessly perform near field communication between the display device 100 and a video forming device (not shown) according to a control of the controller 110. Near field communication techniques may include Bluetooth, Infrared Data Association (IrDA), and the like.

The display device 100 may include at least one of the mobile communication module 120, the wireless LAN module 131, and the near field communication module 132. For example, the display device 100 may include a combination of the mobile communication module 120, the wireless LAN module 131, and the near field communication module 132 according to a capability of the display device 100.

The multimedia module 140 may include the broadcasting communication module 141, the audio reproduction module 142, and the video reproduction module 143. The broadcasting communication module 141 may receive a broadcasting signal (for example, a TeleVision (TV) broadcasting signal, a radio broadcasting signal, or a data broadcasting signal) and broadcasting additional information (for example, an Electric Program Guide (EPS) or an Electric Service Guide (ESG)) broadcasted from a broadcasting station through a broadcasting communication antenna (not shown) according to a control of the controller 110. The audio reproduction module 142 may reproduce a digital audio file (for example, a file having an extension of mp3, wma, ogg or wav) stored or received according to a control of the controller 110. The video reproduction module 143 may reproduce a digital video file (for example, a file having an extension of mpeg, mpg, mp4, avi, mov or mkv) stored or received according to a control of the controller 110. The video reproduction module 143 may reproduce the digital audio file.

The multimedia module 140 may include the audio reproduction module 142 and the video reproduction module 143 except for the broadcasting communication module 141. Furthermore, the audio reproduction module 142 or the video reproduction module 143 of the multimedia module 140 may be included in the controller 110.

The camera module 150 may include at least one of the first camera 151 and the second camera 152 for photographing a still image or a video according to a control of the controller 110. Furthermore, the first camera 151 or the second camera 152 may include an auxiliary light source (for example, a flash (not shown)) for providing light required for photographing. The first camera 151 may be disposed in a front surface of the display device 100, and the second camera 152 may be disposed in a rear surface of the display device 100. Alternatively, the first camera 151 and the second camera 152 may be disposed to be adjacent to each other (for example, an interval between the first camera 151 and the second camera 152 is larger than 1 cm or smaller than 8 cm), and thus a three-dimensional still image or a three-dimensional video may be photographed.

The GPS module 155 may receive a radio wave from a plurality of GPS satellites (not shown) in Earth orbit and calculate a position of the display device 100 by using Time of Arrival from the GPS satellites (not shown) to the display device 100.

The input/output module 160 may include at least one of the plurality of buttons 161, the microphone 162, the speaker 163, the vibration motor 164, the connector 165, and the keypad 166.

The buttons 161 may be formed in a front surface, a side surface, or a rear surface of the housing of the display device 100, and may include at least one of a power/lock button (not shown), a volume button (not shown), a menu button, a home button, a back button, a search button 161, and the like.

The microphone 162 receives a voice or a sound and generates an electrical signal according to a control of the controller 110.

The speaker 163 may output sounds corresponding to various signals (for example, a wireless signal, a broadcasting signal, a digital audio file, a digital video file, photographing a picture, or the like) of the mobile communication module 120, the sub communication module 130, the multimedia module 140, or the camera module 150 to an outside of the display device 100 according to a control of the controller 110. The speaker 163 may output sounds (for example, a button control sound or a ring back tone corresponding to phone communication) corresponding to functions performed by the display device 100. One or more speakers 163 may be formed in a proper position or positions of the housing of the display device 100.

The vibration motor 164 may convert an electrical signal to a mechanical vibration according to a control of the controller 110. For example, when the display device 100 in a vibration mode receives voice phone communication from another device (not shown), the vibration motor 164 operates. One or more vibration motors 164 may be formed within the housing of the display device 100. The vibration motor 164 may operate in response to a touch action of the user on the touch screen 190 and continuous motions of the touch on the touch screen 190.

The connector 165 may be used as an interface for connecting the display device 100 with an external device (not shown) or a power source (not shown). The connector 165 may transmit data stored in the storage unit 175 of the display device 100 to the external device (not shown) through a wired cable connected to the connector 165 or receive the data from the external device (not shown) according to a control of the controller 110. Power may be input or a battery (not shown) may be charged from the power source (not shown) through the wired cable connected to the connector 165.

The keypad 166 may receive a key input from the user to control the display device 100. The keypad 166 includes a physical keypad (not shown) formed in the display device 100 or a virtual keypad (not shown) displayed on the touch screen 190. The physical keypad (not shown) formed in the display device 100 may be omitted according to a capability or a structure of the display device 100.

The sensor module 170 includes at least one sensor for detecting a state of the display device 100. For example, the sensor module 170 may include a proximity sensor for detecting whether the user is close to the display device 100, an illumination sensor (170a of FIG. 2) for detecting light adjacent to the display device 100, or a motion sensor (not shown) for detecting an operation of the display device 100 (for example, a rotation of the display device 100, or an acceleration or vibration applied to the display device 100). At least one sensor may detect the state, generate a signal corresponding to the detection, and transmit the generated signal to the controller 110. The sensor of the sensor module 170 may be added or omitted according to a capability of the display device 100.

The storage unit 175 may store signals or data input/output in accordance with operations of the mobile communication module 120, the sub communication module 130, the multimedia module 140, the camera module 150, the GPS module 155, the input/output module 160, the sensor module 170, and the touch screen 190 according to a control of the controller 110. The storage unit 175 may store a control program for controlling the display device 100 or the controller 110 and applications.

The term "storage unit" includes a memory card (not shown) (for example, a Secure Digital (SD) card, a memory stick, or the like) mounted to the storage unit 175, the ROM 112 or the RAM 113 within the controller 110, or the display device 100. The storage unit may include a nonvolatile memory, a volatile memory, a Hard Disk Drive (HDD), a Solid State Drive (SSD), or the like.

The power supplier 180 may supply power to one battery or a plurality of batteries (not shown) disposed in the housing of the display device 100 according to a control of the controller 110. The one battery or the plurality of batteries (not shown) supply power to the display device 100. Furthermore, the power supplier 180 may supply power input from an external power source (not shown) through the wired cable connected to the connector 165 to the display device 100.

The touch screen 190 may provide a user interface corresponding to various services (for example, phone communication, data transmission, broadcasting, and photographing a picture) to the user. The touch screen 190 may transmit an analog signal corresponding to at least one touch input into the user interface to the touch screen controller 195. The touch screen 190 may receive at least one touch through a body part of the user (for example, fingers including a thumb) or a touchable input means. In addition, the touch screen 190 may receive a continuous motion of one touch. The touch screen 190 may transmit an analog signal corresponding to the continuous motion of the input touch to the touch screen controller 195.

The touch is not limited to a touch between the touch screen 190 and the body part of the user or the touchable input means, but may include a non-touch (for example, a case where a detectable interval between the touch screen 190 and the body part of the user or the touchable input means is equal to or smaller than 1 mm). The detectable interval of the touch screen 190 may be changed according to a capability of a structure of the display device 100.

The touch screen 190 may be implemented in, for example, a resistive type, a capacitive type, an infrared type, or an acoustic wave type.

The touch screen controller 195 converts the analog signal received from the touch screen 190 to a digital signal (for example, X and Y coordinates) and transmits the digital signal to the controller 110. The controller 110 may control the touch screen 190 by using the digital signal received from the touch screen controller 195. For example, the controller 110 may allow a shortcut icon (not shown) displayed on the touch screen 190 to be selected or executed in response to the touch. Furthermore, the touch screen controller 195 may be included in the controller 110.

Figure 2:
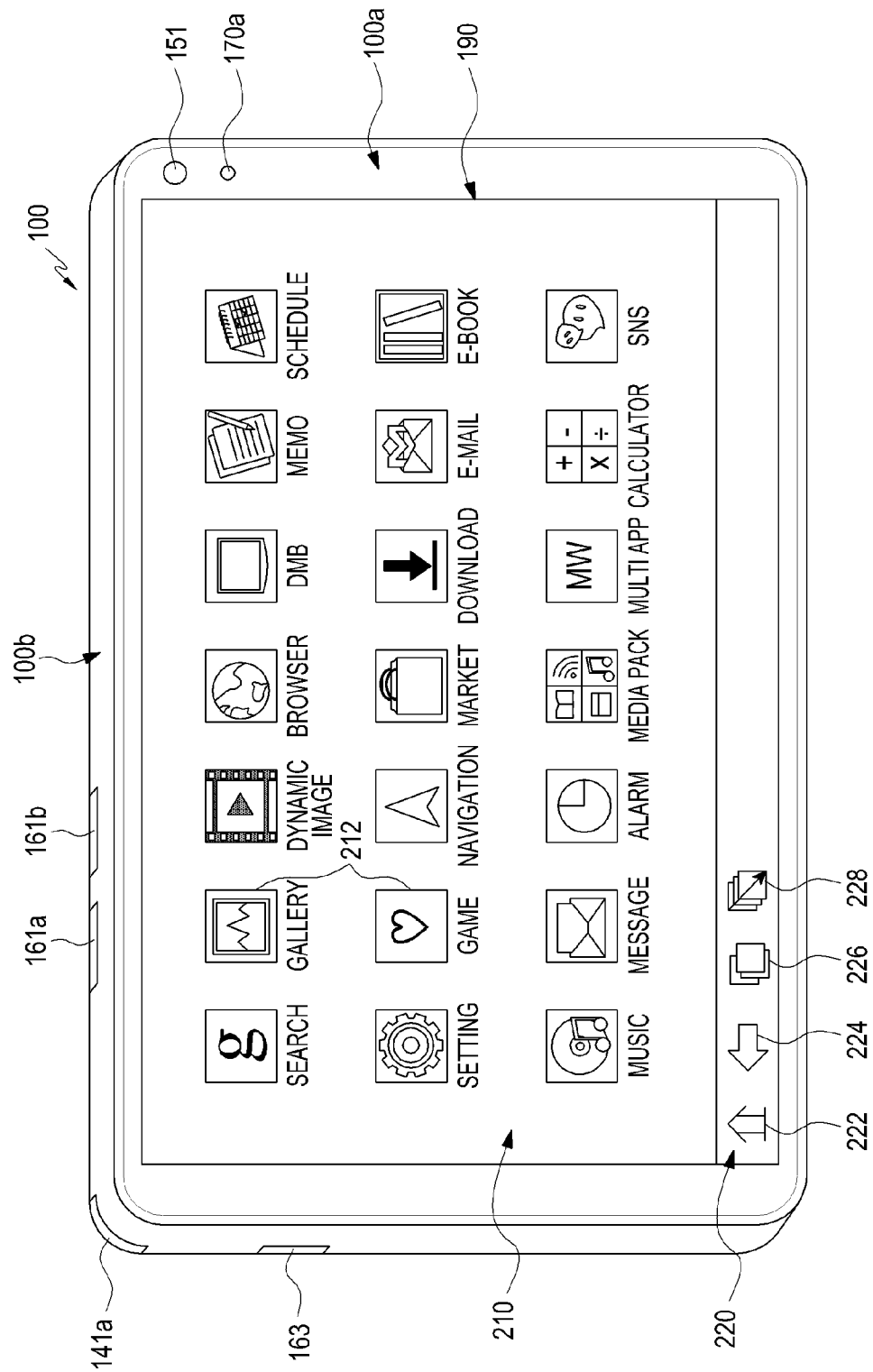
FIG. 2 is a perspective view of a device according to an exemplary embodiment of the present invention.

FIG. 2 is a perspective view of the device according to an exemplary embodiment of the present invention.

Referring to FIG. 2, the touch screen 190 is disposed in a center of a front surface 100a of the display device 100. The touch screen 190 has a large size to almost cover the front surface 100a of the display device 100. The first camera 151 and the illumination sensor 170a may be disposed in an edge of the front surface 100a of the display device 100. For example, a power/reset button 161a, a volume button 161b, the speaker 163, a terrestrial Digital Multimedia Broadcast (DMB) antenna 141a for receiving a broadcast, the microphone (not shown), the connector (not shown) and the like may be disposed on the side surface 100b of the display device 100, and the second camera (not shown) may be disposed on the rear surface (not shown) of the display device 100.

The touch screen 190 includes a main screen 210 and a lower bar 220. In FIG. 2, the display device 100 and the touch screen 190 have a horizontal length larger than a vertical length. In this case, it is defined that the touch screen 190 is horizontally arranged.

The main screen 210 is an area where one application or a plurality of applications are executed. FIG. 2 shows an example where a home screen is displayed on the touch screen. 190. The home screen is a first screen displayed on the touch screen 190 when the display device 100 is turned on. Execution keys 212 for executing a plurality of applications stored in the display device 100 are arranged on the home screen in rows and columns. The execution keys 212 may be formed in icons, buttons, texts or the like. When each execution key 212 is touched, an application corresponding to the touched execution key 212 is executed and displayed on the main screen 210.

The lower bar 220 is elongated to be long in a horizontal direction in a lower end of the touch screen 190 and includes standard function buttons 222, 224, 226, and 228. A home screen movement button 222 makes the home screen displayed on the main screen 210. For example, when the home screen movement key 222 is touched while applications are executed on the main screen 210, the home screen as illustrated in FIG. 2 is displayed on the main screen 210. A back button 224 may display a screen executed just before a currently executed screen or terminate an application most recently used. A multi view mode button 226 displays a plurality of applications on the main screen 210 in a multi view mode. A mode switching button 228 switches modes of a plurality of currently executed applications to different modes and displays them on the main screen 210. For example, when the mode switching button 228 is touched, a switching is performed between a freestyle mode in which a plurality of applications are displayed while being spaced apart from each other or partially overlapping each other and a split mode in which the plurality of applications are displayed separately in different areas on the main screen 210.

Furthermore, an upper bar (not shown) for displaying a state of the display device 100, such as a charging state of a battery, an intensity of a received signal, and a current time may be formed in an upper end of the touch screen 190.

Meanwhile, a lower bar 220 and the upper bar (not shown) may be omitted on the touch screen 190 according to an Operating System (OS) of the display device 100 or an application executed in the display device 100. When both the lower bar 220 and the upper bar (not shown) are not displayed on the touch screen 190, the main screen 210 may be formed on an entire area of the touch screen 190. Furthermore, the lower bar 220 and the upper bar (not shown) may be translucently displayed on the main screen 210 while overlapping each other.

Figure 3:
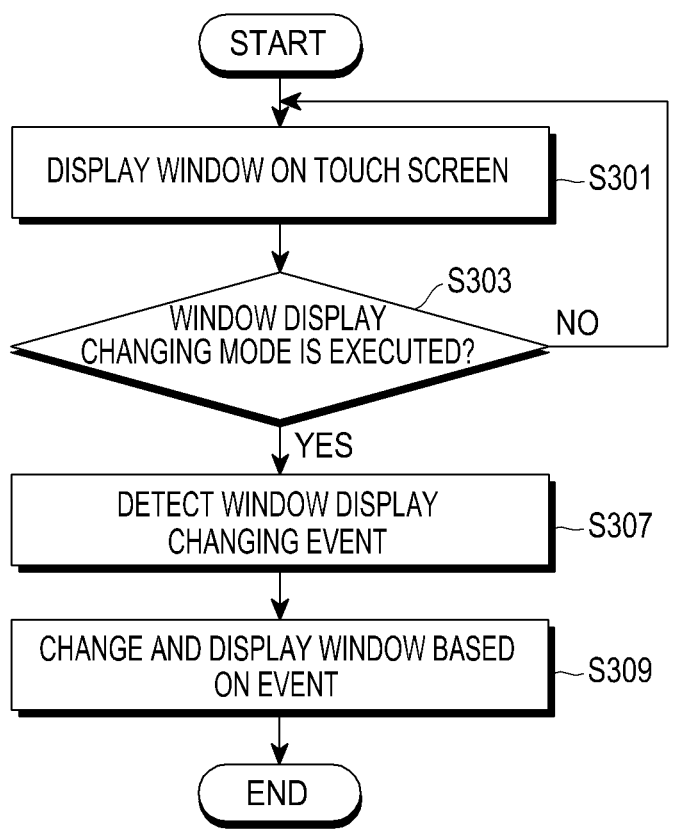
FIG. 3 is a flowchart of a display device controlling method according to an exemplary embodiment of the present invention.

FIG. 3 is a flowchart of a display device controlling method according to an exemplary embodiment of the present invention.

Referring to FIG. 3, the display device 100 displays at least one window on the touch screen 190 in step S301. For example, the controller 110 may determine a freestyle mode as a display mode. The window may be an area including an execution screen of a particular application, a title bar for the executed application, and a control area. Objects associated with the application may be displayed on the execution screen of the application. The object may be formed in various types of a text, a figure, an icon, a button, a check box, a picture, a video, a web, a map, and the like. When the user touches the object, a function or an event predefined for the object may be performed in a corresponding application. The object may be called a view according to an operating system.

The user may execute a window control mode for controlling an operation of a particular window in step S303. The user may execute the window control mode, for example, by touching the title bar of the particular window a preset number of times. An exemplary method of executing the window control mode will be described below. The operation of the window may be an event for moving the window, resizing the window, minimizing a window size, setting the window size to a defaulted size, or releasing the window control mode.

When the window control mode is not executed (S303-N), the display device 100 displays the window on the touch screen 190. Meanwhile, when the window control mode is executed (S303-Y), the controller 110 may deactivate the execution of the application executed in the window and detect a window display changing event in step S307. Here, the window display changing event may be an event preset to change a display and a position of the window. Meanwhile, the window control event is an event capable of controlling the window. The window display changing event may be included in a window control event. The window control event may include a window control mode releasing event as well as the window display changing event.

For example, the controller 110 may not dispatch the event to the application executed in the window. Accordingly, even though the user inputs a particular event into the application executed in the window, the application is not executed in accordance with the particular event. For example, the controller 110 uses a dialog so that a touch event is taken by a window control related unit, not the application. Accordingly, the controller 110 may not dispatch the touch event, after the execution of the window control mode, to the application. In this case, the controller 110 converts a coordinate system of the input touch event to a coordinate system of the corresponding window. For example, the controller 110 converts an absolute coordinate system value input into the touch screen to a relative coordinate system value for the corresponding window, and may determine an action intended by the user based on the converted coordinate system value.

The controller 110 may detect the window display changing event in step S307. More specifically, the controller 110 may detect whether the window display changing event is input into an internal area of the window. The window display changing event may be, for example, a motion of touching one point of the internal area of the window and dragging the one point.

The controller 110 may control the window and change and display at least one of a size and a position of the window based on the window display changing event in step S309. For example, when the input window display changing event is the motion of touching the one point of the internal area of the window and dragging the one point in an external direction, the controller 110 enlarges and displays the window size. For example, when the input window display changing event is the motion of touching the one point of the internal area of the window and dragging the one point in an internal direction, the controller 110 reduces and displays the window size. Moreover, the controller 110 may control the operation of the window and change and display at least one of the size and the position of the window based on preset various window display changing events.

When the user intentionally inputs an illogical window display changing event, the controller 110 may control the window display changing event to act only in a limited area allocated for each application. For example, when the user inputs the window size which is excessively large or small, the controller 110 may display the window within the limited area.

When at least one of the size and the position of the window is changed, the user may end the window control mode. For example, the user may end the window control mode by clicking the back button 224. Alternatively, the user may end the window control mode by touching an external area of the changed and displayed window. Alternatively, the user may end the window control mode by touching the title bar of the corresponding window a preset number of times. However, the above description is only an exemplary embodiment of the present invention, and the controller 110 may end the window control mode in accordance with various window control mode ending events.

When the window control mode ends, the controller 110 may dispatch the event to the application executed in the window. Accordingly, when the user inputs a particular event into the application executed in the window, the application may be executed in accordance with the particular event.

As described above, the controller 110 of the display device 100 changes a window display based on the window display changing event input into the internal area of the window, not a boundary of the window. Accordingly, even when the user controls the touch screen by using an input means having a relatively wide contact area, such as a finger, the window display may be changed. More particularly, the controller 110 does not dispatch the event to the application executed in the window when executing the window control mode. Accordingly, even though the user inputs the window display changing event into the internal area of the window, the application is not executed in accordance with the event.

FIGS. 4A through 4F are conceptual diagrams of a display device according to an exemplary embodiment of the present invention.

Figure 4A:
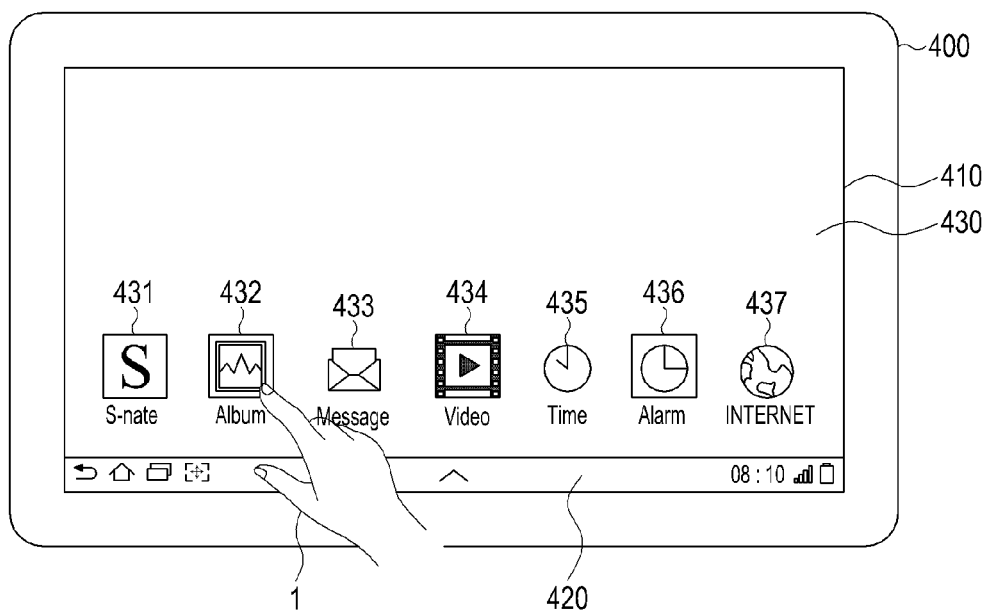
FIGS. 4A through 4F are conceptual diagrams of a display device according to an exemplary embodiment of the present invention.

Referring to FIG. 4A, a display device 400 includes a touch screen 410. A menu screen 430 is displayed on the touch screen 410. The menu screen 430 may be a screen displayed when the display device 400 operates. The menu screen 430 includes a plurality of icons 431 through 437 for executing applications. Meanwhile, a lower bar 420 may be displayed in a lower end of the menu screen 430 in a horizontally elongated form.

A user 1 executes one application 432 of a plurality of applications. For example, it is assumed that the user 1 executes an album application. The user 1 may control the display device 400 such that an application which the user desires to execute is executed, by touching the application. Meanwhile, although it is illustrated in FIG. 4A that the user 1 touches the touch screen 410 by using his/her finger, the user 1 may touch the touch screen 410 by using another input means, such as a stylus pen. The scope of the present invention is not limited by the input means used by the user 1. Although user 1 executes one application 431 by using his/her finger as illustrated in FIG. 4A, user 1 may execute one application 431 by a stylus pen or other input means.

When the user executes the particular application 432, for example, the album application, the controller 110 displays an execution screen 450 of the corresponding application on the touch screen 410.

Figure 4B:
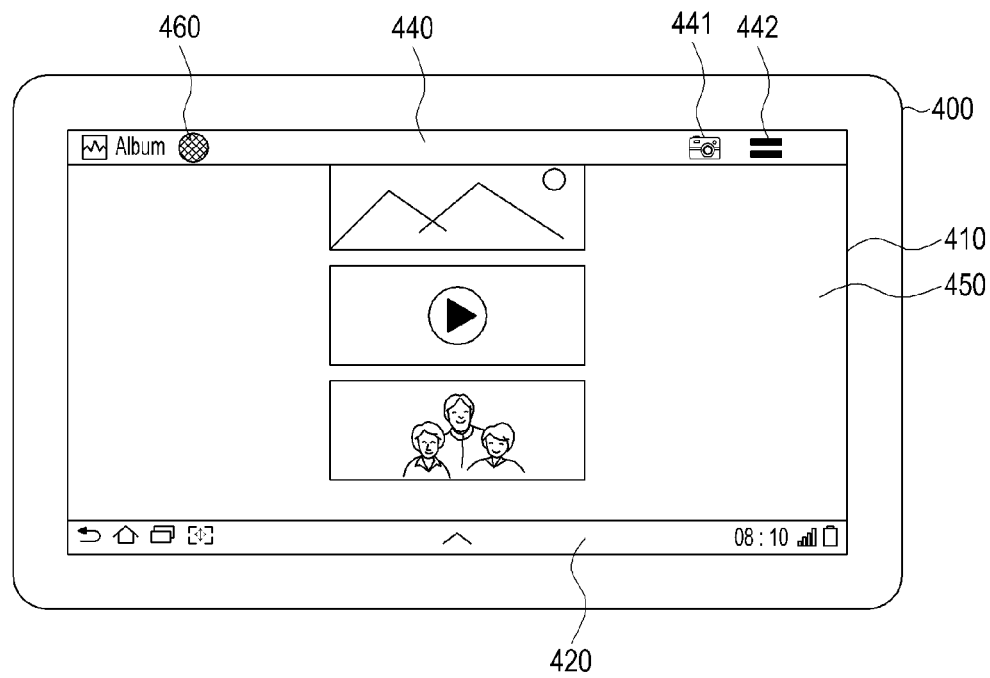

Referring to FIG. 4B, an application execution screen 450 on which the album application is executed is illustrated. A plurality of objects may be displayed on the application execution screen 450. For example, a title bar 440 for displaying tool icons of the album application and an image or thumbnail images stored in the album application may be displayed in the album application. A camera execution icon 441 and a list viewing icon 442 may be displayed in the title bar 440.

The controller 110 may display the application execution screen 450 on an entire screen when initially executing the application. Here, the entire screen may be an area except for the lower bar 420. For example, the controller 110 may not display the title bar when initially executing the application. However, the above described screen configuration is only an example, and the controller 110 may display the application execution screen 450, the title bar 440, and a control area together from the initial execution of the application. Alternatively, the controller 110 may display the control area in a partial area of the touch screen 410, not in the entire area of the touch screen 410, in a window form from the initial execution of the application.

The user may execute the window control mode by touching 460, for example, the title bar 440 of the album application a preset number of times. For example, the user may execute the window control mode by touching 460 the title bar 440 two times, and may name the two times of touch a double tap.

Alternatively, the user may execute the window control mode by touching 460 the title bar 440 for a preset time. An operation of maintaining the touch for the preset time may be named a long-press. The long-press may maintain the touch, for example, for one second.

Meanwhile, a window control mode execution button may be displayed in the title bar 440. The user may execute the window control mode by touching 460 the window control mode execution button (not shown) existing on the title bar 440.

Figure 4C:
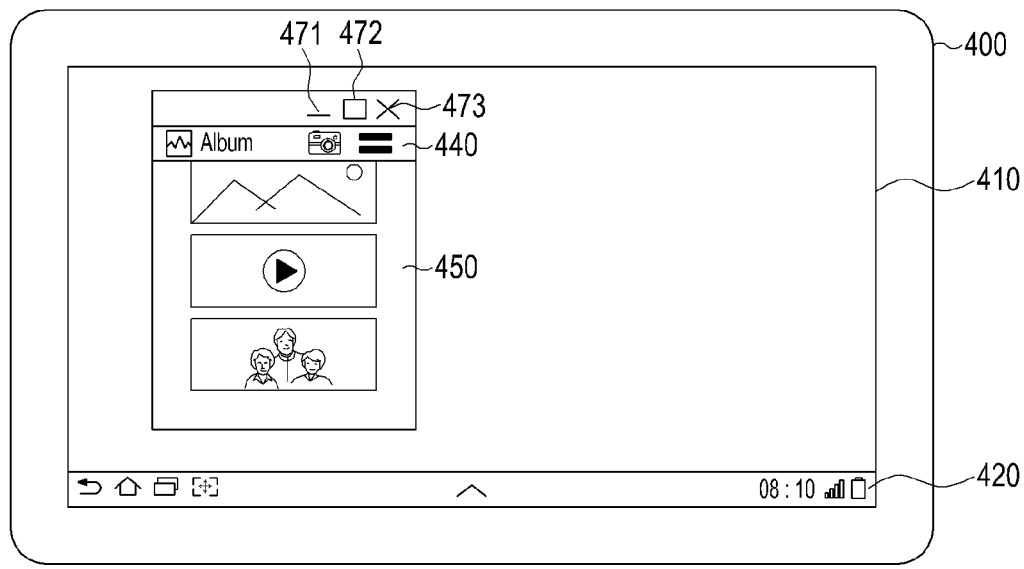

Referring to FIG. 4C, a screen for the window control mode is illustrated. The title bar 440 and the application execution screen 450 reduced from the entire screen to have a predefined size may be displayed. Furthermore, a control area 470 may also be displayed above the title bar 440. The control area 470 may include a minimization button 471, a maximization button 472, and an end button 473. When the window control mode is executed, the controller 110 displays the control area 470, the title bar 440, and the application execution screen 450 on one window. Furthermore, the controller 110 may not dispatch an event input into the title bar 440 or the application execution screen 450. When the window control mode is executed, the user inputs the window display changing event.

Figure 4D:
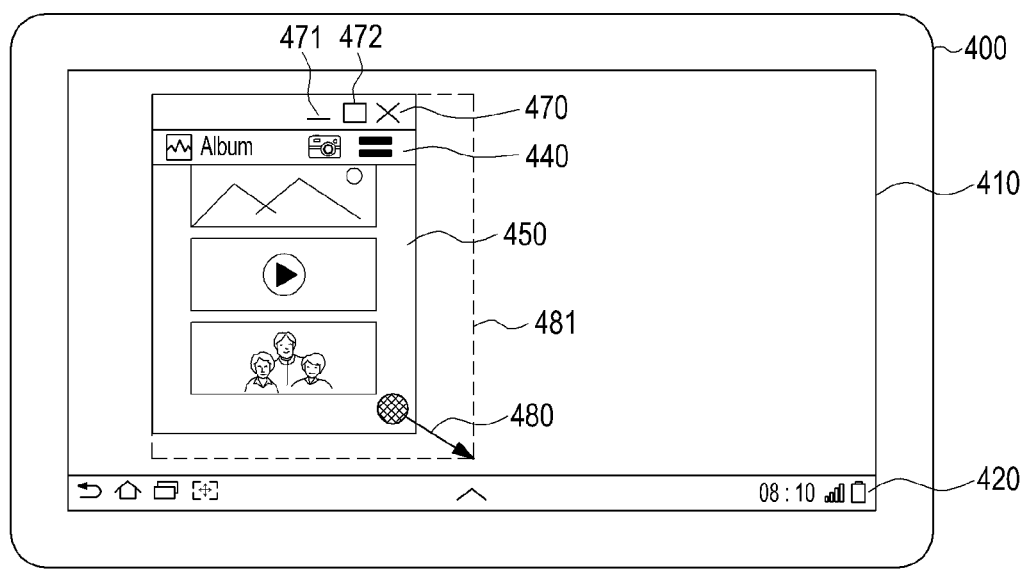

Referring to FIG. 4D, the window display changing event may be a motion of touching one point in a right lower end of the application execution screen 450 and performing a dragging 480 in a right bottom direction.

The controller 110 detects the window display changing event. For example, the controller 110 detects a start point of the dragging 480, a direction of the dragging 480, and a distance of the dragging 480. The controller 110 may determine a direction in which the window size is reduced or enlarged, based on the start point of the dragging 480. The controller 110 may determine to reduce or enlarge the window size based on the direction of the dragging 480. The controller 110 may determine an enlargement magnification or reduction magnification of the window based on the distance of the dragging 480.

The controller 110 determines a right direction as an enlargement direction of the window and a left direction as a reduction direction of the window from a fact that the start point of the dragging 480 is a right lower end. The controller 110 determines to enlarge the window from a fact that the direction of the dragging 480 is a right bottom direction. When the direction of the dragging is a left top direction, the controller 110 may determine to reduce the window.

The controller 110 determines the enlargement magnification of the window based on the distance of the dragging 480. For example, the controller 110 may determine a larger enlargement magnification as the distance of the dragging 480 is longer. The controller 110 changes the window size and displays the changed window on the touch screen 410 based on the determined enlargement direction, a fact of whether the enlargement is performed, and the enlargement magnification. In this case, a guide line 481 identifiable by the user may also be displayed on the touch screen 410. The guide line 481 may be displayed in accordance with the enlarged window size. Meanwhile, as described above, the controller 110 may enlarge the window size in a right direction. For example, the controller 110 may enlarge the window size by fixing positions of left and top boundaries of the window 470 before the change and changing positions of right and bottom boundaries.

Figure 4E:
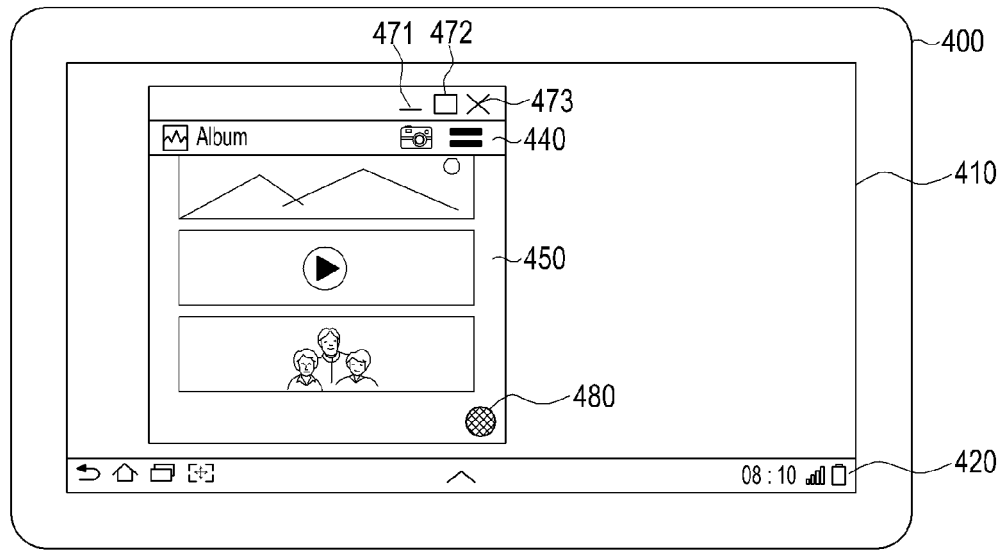

Referring to FIG. 4E, a result screen of the exemplary embodiment of FIG. 4D is illustrated. As illustrated in FIG. 4E, it may be identified that the window is enlarged in the right direction and displayed in comparison with FIG. 4D. Meanwhile, in FIG. 4E, the user may maintain the touch 480. The controller 110 may determine that the window display changing event is detected until the touch 480 ends. For example, when the user inputs another dragging while maintaining the touch 480, the controller 110 may change the window size according to the dragging and display the changed window.

Figure 4F:
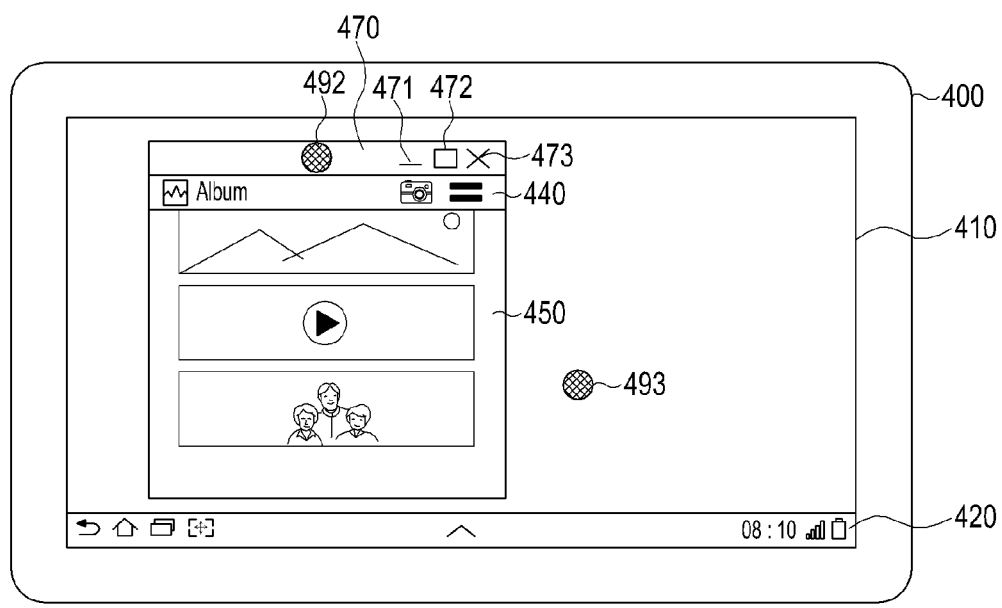

Referring to FIG. 4F, when the touch 480 of FIG. 4E ends, it may be determined that the window display changing event ends. Furthermore, the user may end the window control mode by performing a clicking 491 on the back button, performing a touch 493 on an external area of the window, or performing a touch 492 on the control area 470 a preset number of times. The events for ending the window control mode may be named the window control mode releasing event. When the window control mode ends, the controller 110 may fix and display the changed window size.

Figure 5A:
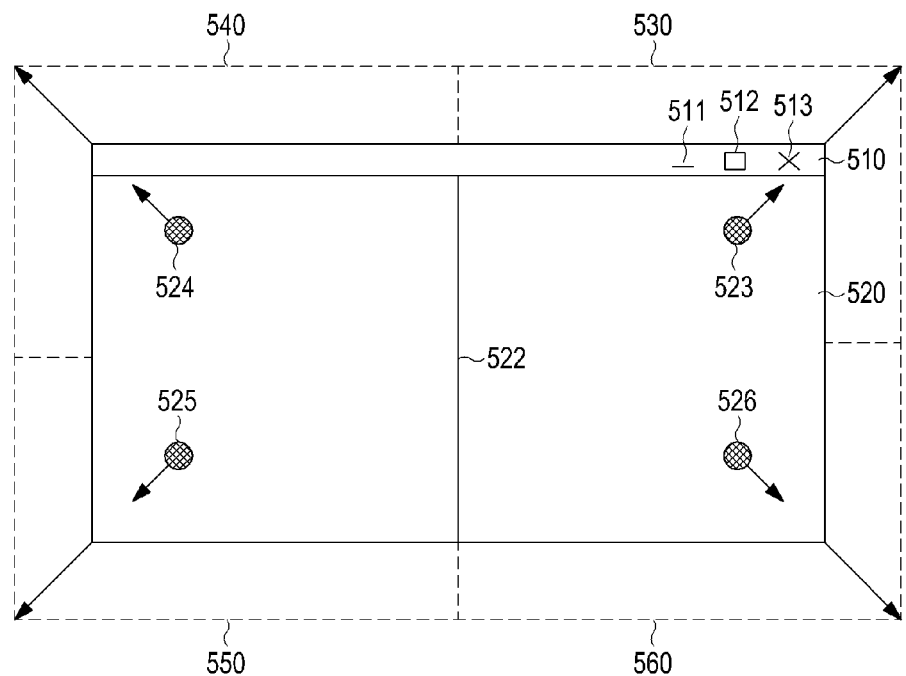
FIG. 5A is a conceptual diagram for describing a display changing event according to an exemplary embodiment of the present invention.

FIG. 5A is a conceptual diagram for describing a display changing event according to an exemplary embodiment of the present invention.

Referring to FIG. 5A, the window includes a control area 510 and an application execution screen 520. A title bar (not shown) may be displayed on the application execution screen. The control area 510 includes a minimization button 511, a maximization button 512, and an end button 513.

The application execution screen 520 may be divided into a left screen and a right screen based on a right-left boundary line 522. When the window display changing event corresponds to a dragging input into an internal area of the application execution screen 520, the controller 110 detects a start point of the dragging. When the dragging starts from one point (i.e., 524 or 525) of the left screen based on the left-right boundary line 522, the controller 110 may determine a left direction as an enlargement direction and a right direction as a reduction direction. When the dragging in a left top direction is input in the one point 524 of the left screen, the controller 110 changes 540 the window size by enlarging the window in the left direction. When the dragging in a left bottom direction is input in the one point 525 of the left screen, the controller 110 changes 550 the window size by enlarging the window in the left direction. Meanwhile, when the direction of the dragging corresponds to an internal direction, not an external direction, the controller 110 reduces the window size and displays the reduced window. In this case, the controller 110 may reduce the window size in the right direction.

When the dragging starts from one point (i.e., 523 or 526) of the right screen based on the left-right boundary line 522, the controller 110 may determine a right direction as an enlargement direction and a left direction as reduction direction. When the dragging in a right top direction is input in the one point 523 of the right screen, the controller 110 changes 530 the window size by enlarging the window in the left direction. When the dragging in a right bottom direction is input in the one point 526 of the right screen, the controller 110 changes 560 the window size by enlarging the window in the right direction. Meanwhile, when the direction of the dragging corresponds to an internal direction, not an external direction, the controller 110 reduces the window size in the left direction and displays the reduced window. In this case, the controller 110 may reduce the window size in the left direction.

Meanwhile, the control area 510, which will be described below, may be used as an area related to an event of changing a position of the window.

Figure 5B:
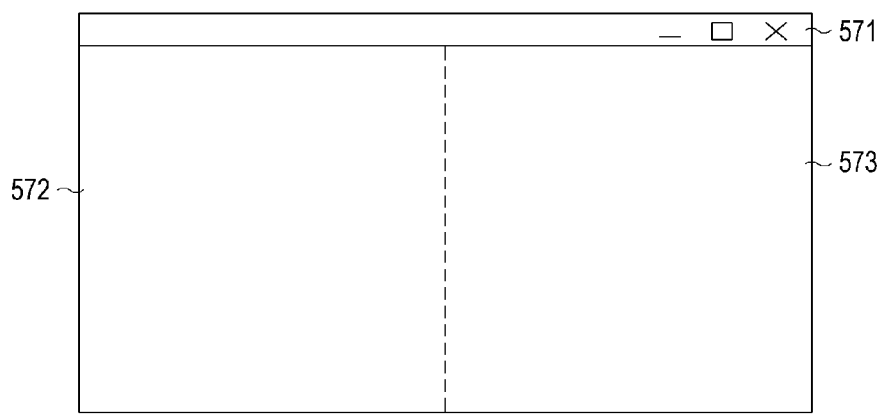
FIG. 5B is a conceptual diagram for describing each area of a window according to an exemplary embodiment of the present invention.

FIG. 5B is a conceptual diagram for describing each area of a window according to an exemplary embodiment of the present invention.

Referring to FIG. 5B, the window may be divided into a movement area 571, a left size control area 572, and a right size control area 573. When the event is input in the movement area 571 after the window control mode is initiated, the controller 110 may recognize the event as an event for moving the window position. When the event is input in the left size control area 572 after the window control mode is initiated, the controller 110 may recognize the event as an event for enlarging the window size in the left direction or reducing the window size in the right direction. Here, the enlargement in the left direction may fix the positions of the top and right boundaries of the window and change the positions of the bottom and left boundaries of the window. When the event is input in the right size control area 573 after the window control mode is initiated, the controller 110 may recognize the event as an event for enlarging the window size in the right direction and reducing the window size in the left direction. Here, the enlargement in the right direction may fix the positions of the top and bottom boundaries of the window and change the positions of the bottom and right boundaries of the window. Here, the movement area 571 may be the same as the aforementioned control area. Furthermore, the left size control area 572 and the right size control area 573 may be a left divided screen and a right divided screen of the application execution screen, respectively.

Figure 6:
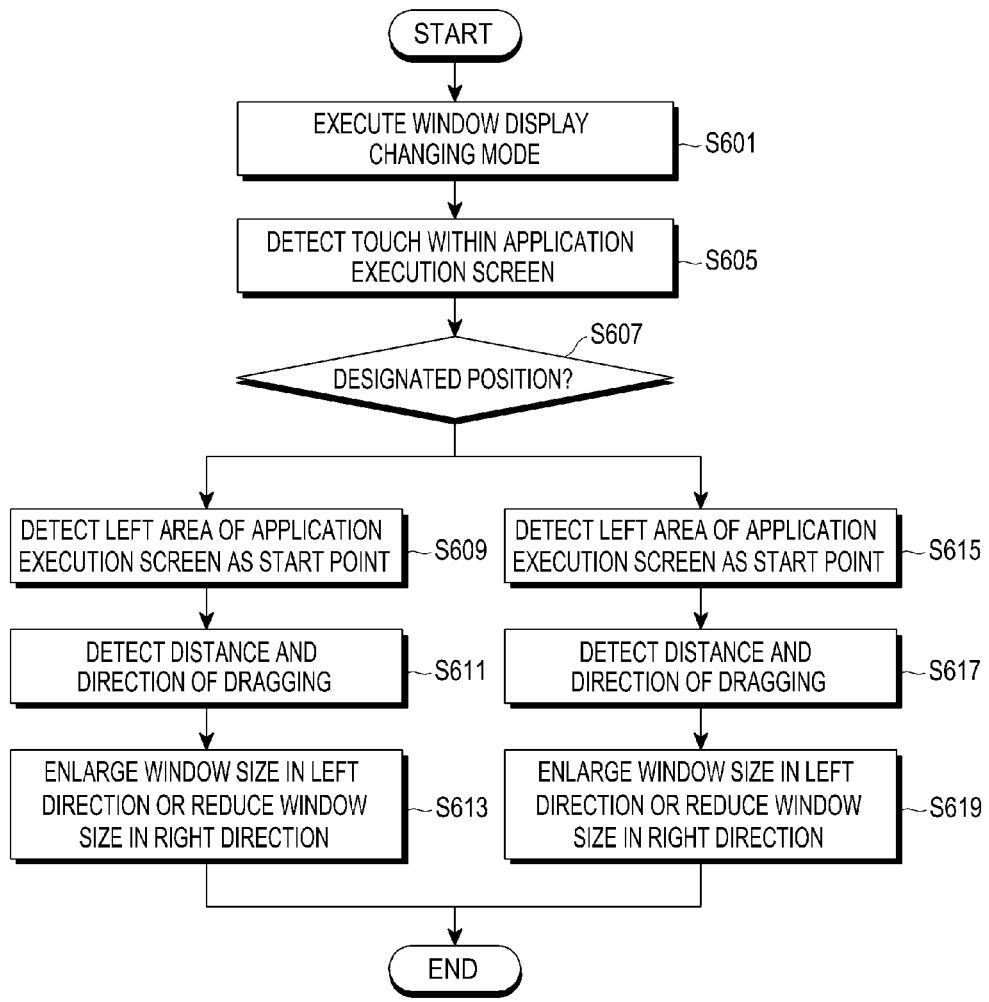
FIG. 6 is a flowchart of a display device controlling method according to an exemplary embodiment of the present invention.

FIG. 6 is a flowchart of a display device controlling method according to an exemplary embodiment of the present invention. More particularly, FIG. 6 is a flowchart of a display device controlling method when a window display changing event corresponds to a dragging input within an application execution screen.

Referring to FIG. 6, the display device executes the window control mode based on a user's input in step S601. When the window control mode is executed, the display device does not dispatch the event to the application executed in the window.

The display device detects a touch performed within the application execution screen by the user in step S605. The display device may detect a position of a start point of a dragging in step S607.

When the position of the start point of the dragging is a left screen of the application execution screen in step S609, the display device determines a left direction as an enlargement direction of the window and a right direction as a reduction direction. The display device detects a distance and a direction of the dragging in step S611. As described above, the display device determines to enlarge or reduce the window based on the direction of the dragging. Furthermore, the display device determines an enlargement magnification or a reduction magnification based on the distance of the dragging. The display device may enlarge the window size in the left direction or reduce the window size in the right direction, and display the enlarged or reduced window in step S613.

When the position of the start point of the dragging is a right screen of the application execution screen in step S615, the display device determines the right direction as the enlargement direction of the window and the left direction as the reduction direction of the window. The display device detects the distance and the direction of the dragging in step S617. As described above, the display device determines whether to enlarge or reduce the window based on the direction of the dragging. Furthermore, the display device determines the enlargement magnification or the reduction magnification based on the distance of the dragging. The display device may enlarge the window size in the right direction or reduce the window size in the left direction, and display the enlarged or reduced window in step S619.

While the configuration for changing the window size has been discussed in the above description, a configuration for changing the window position will be discussed in the following description.

Figure 7:
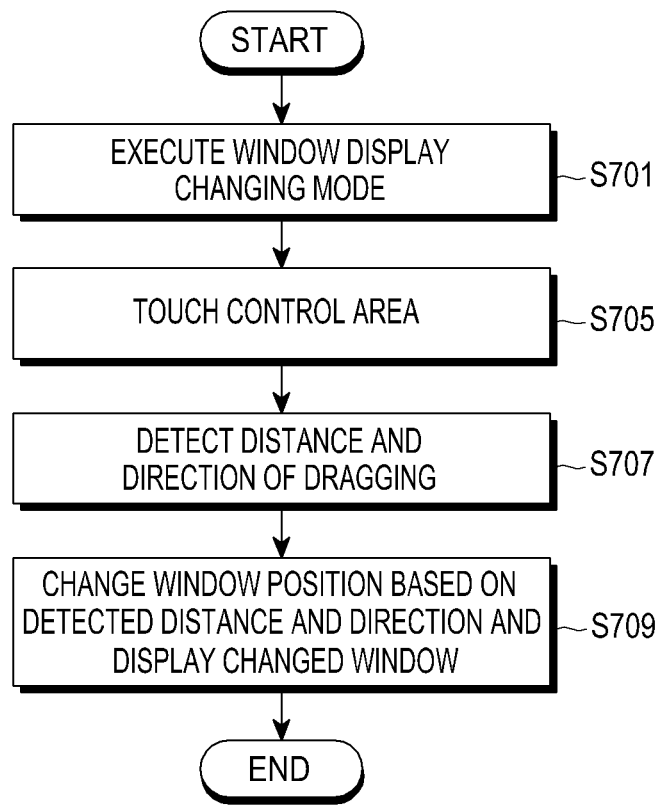
FIG. 7 is a flowchart of a window position changing method according to an exemplary embodiment of the present invention.

FIG. 7 is a flowchart of a window position changing method according to an exemplary embodiment of the present invention.

Referring to FIG. 7, the display device executes the window control mode based on a user's input in step S701. When the window control mode is executed, the display device does not dispatch the event to the application executed in the window.

The user may touch a control area to change the window position in step S705. The display device may recognize a dragging input into the control area as a window position changing event and a dragging event into the application execution screen as a window size changing event.

The display device may detect a distance and a direction of the input dragging in step S707. The display device determines the window position change based on the distance of the dragging. For example, as the distance of the input dragging is longer, the window position may be drastically changed and the changed window is displayed. Furthermore, the display device determines a position change direction of the window based on the direction of the dragging. For example, the window position may be changed in the same direction as the direction of the input dragging and the changed window may be displayed.

The display device changes the window position based on the distance and the direction of the dragging and displays the changed window in step S709.

Figure 8A:
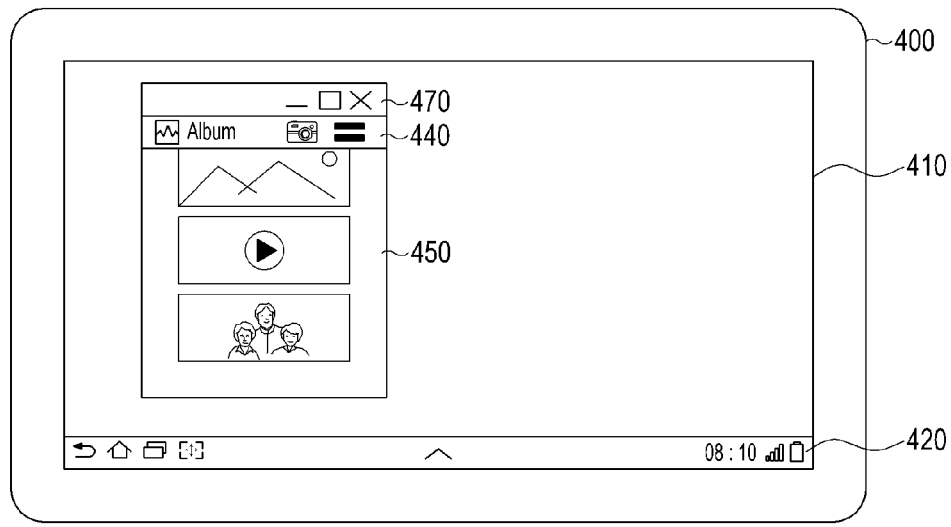
FIGS. 8A through 8C are conceptual diagrams for describing a window position changing method according to an exemplary embodiment of the present invention.
Figure 8B:
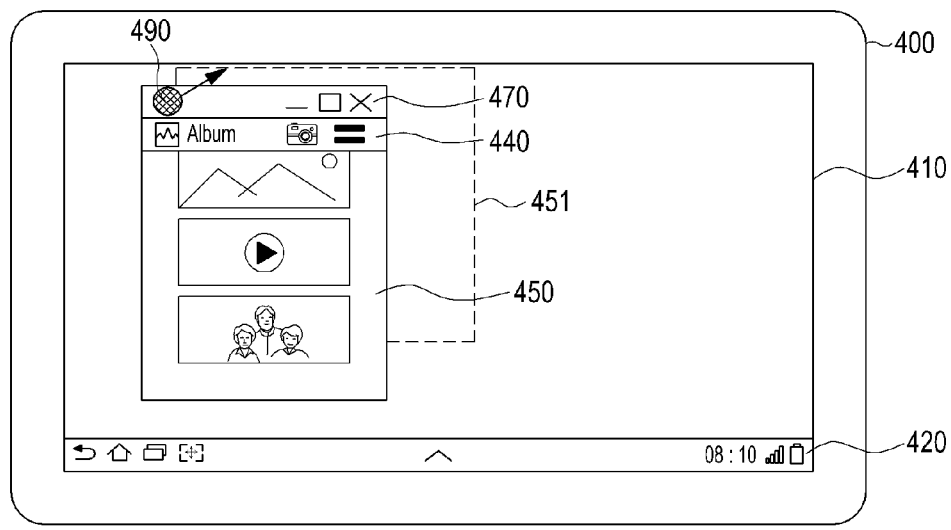
Figure 8C:
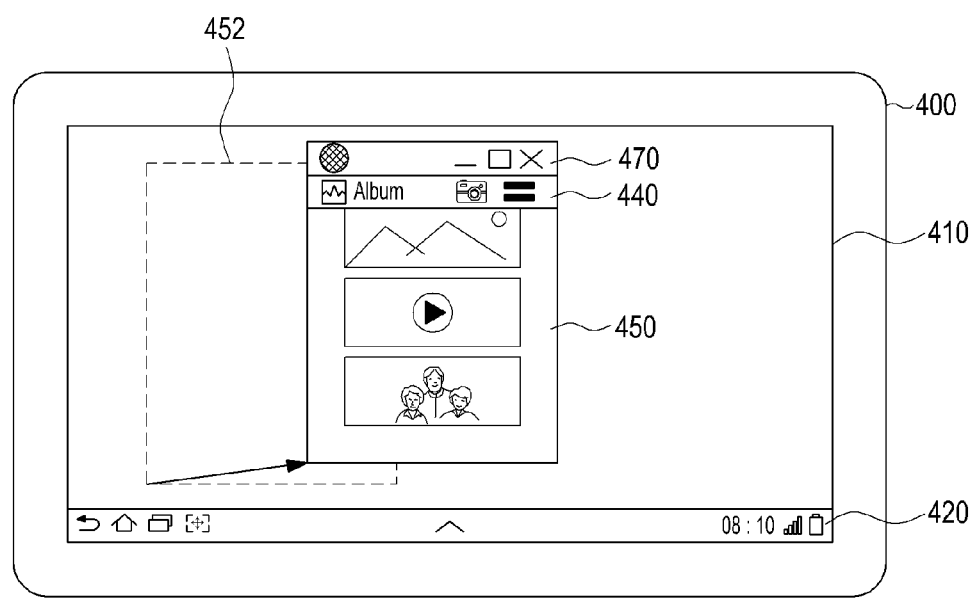

FIGS. 8A through 8C are diagrams for describing a window position changing method according to an exemplary embodiment of the present invention. More particularly, FIGS. 8A through 8C may be screens for the method of FIG. 7.

Referring to FIG. 8A, the screens may be the same as that of FIG. 4C. For example, it is assumed that the window control mode is being executed.

Referring to FIG. 8B, a conceptual diagram for describing a change in the window position is illustrated. Here, the window display changing event may correspond to a dragging input into one point of the control area 470. As described above, the dragging input into the control area 470 may be the window position changing event. In FIG. 8B, the user may input the dragging 490 into one point of the control area 470 in a right top direction. The controller 110 detects that a start point of the dragging 490 is located on the control area 470. The controller 110 determines the window position changing event based on the detected start point of the dragging 490. Furthermore, the controller 110 detects a direction and a distance of the dragging 490. The controller 110 determines a window position change direction based on the direction of the dragging 490. In addition, the controller 110 determines a degree of the window position change based on the distance of the dragging 490. For example, when a dragging distance equal to or larger than 10 pixels of the touch screen 410 is detected, the controller 110 may determine that the window position changing event is detected. Furthermore, the controller 110 may display the window position before the movement by a guide line 451.

Referring to FIG. 8C, a screen for the window having a changed position is illustrated. As illustrated in FIG. 8C, the controller 110 may change and display the window position based on the determined position change direction and position change degree. Meanwhile, the controller 110 may display a previous position 452.

Figure 9:
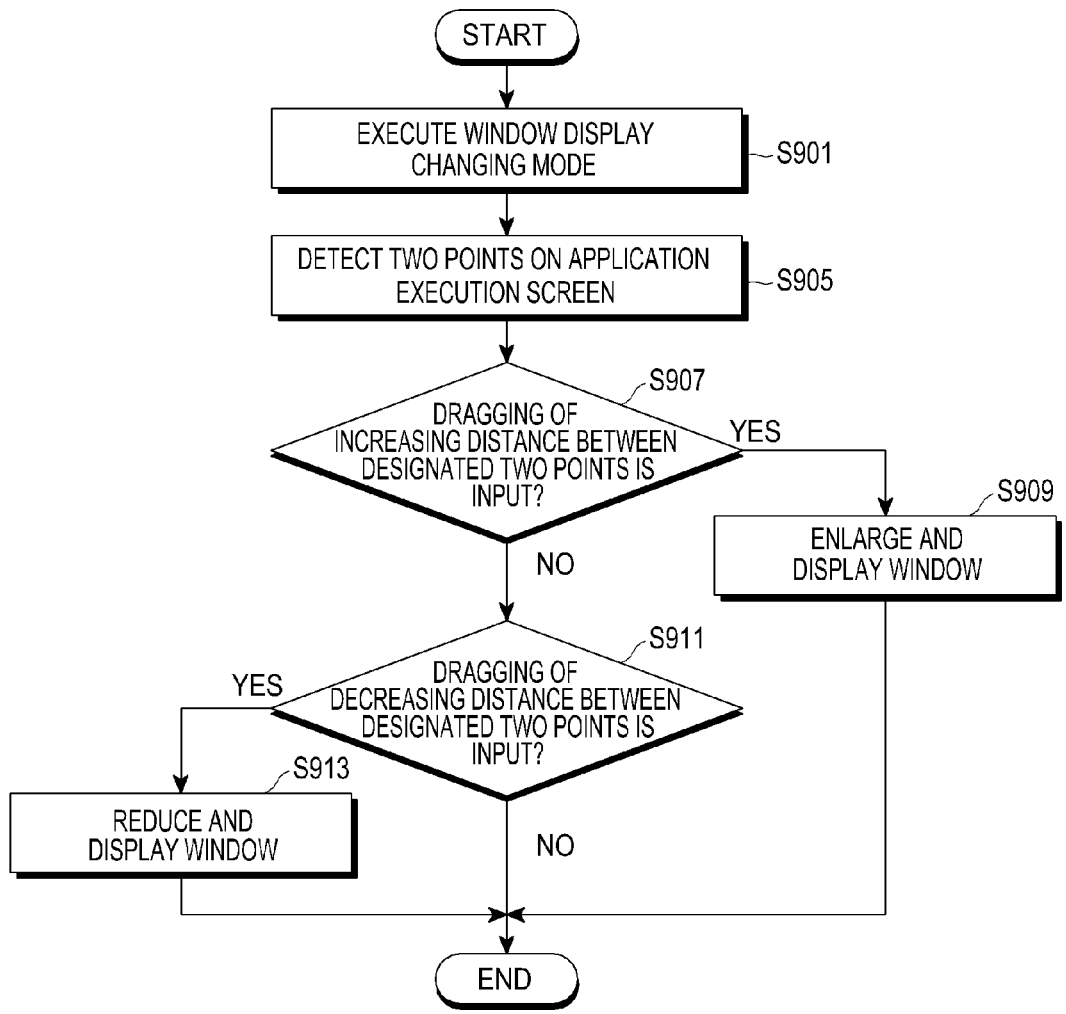
FIG. 9 is a flowchart of a display device controlling method according to an exemplary embodiment of the present invention.

FIG. 9 is a flowchart of a display device controlling method according to an exemplary embodiment of the present invention. More particularly, in the exemplary embodiment of FIG. 9, the window display changing event corresponds to a multi-touch within the application execution screen.

Referring to FIG. 9, the display device executes the window control mode based on a user's input in step S901. When the window control mode is executed, the display device does not dispatch the event to the application executed in the window.

The user may touch two points on the application execution screen. The display device may detect touches on the two points of the application execution screen in step S905.

The user may input a dragging of increasing a distance between the touched two points or a dragging of decreasing the distance between the touched two points.

The display device determines whether the dragging of increasing the distance between the touched two points is input in step S907. When the dragging of increasing the distance between the touched two points is input (S907-Y), the display device enlarges the window and displays the enlarged window in step S909.

When the dragging of increasing the distance between the touched two points is not input (S907-N), the display device determines whether the dragging of decreasing the distance between the touched two points is input in step S911. When the dragging of decreasing the distance between the touched two points is input (S911-Y), the display device reduces the window and displays the reduced window in step S913.

FIGS. 10A through 10E are conceptual diagrams for describing a display device controlling method according to an exemplary embodiment of the present invention.

Figure 10A:
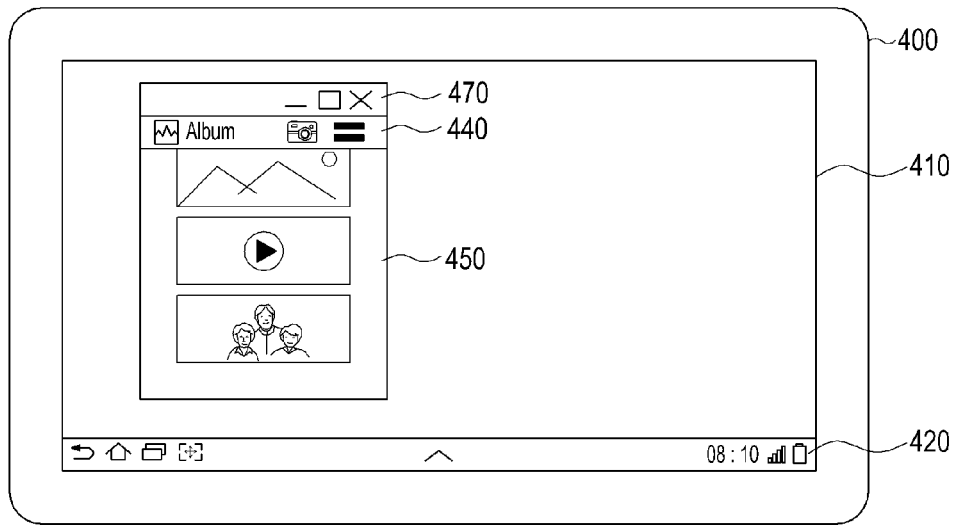
FIGS. 10A through 10E are conceptual diagrams for describing a display device controlling method according to an exemplary embodiment of the present invention.
Figure 10B:
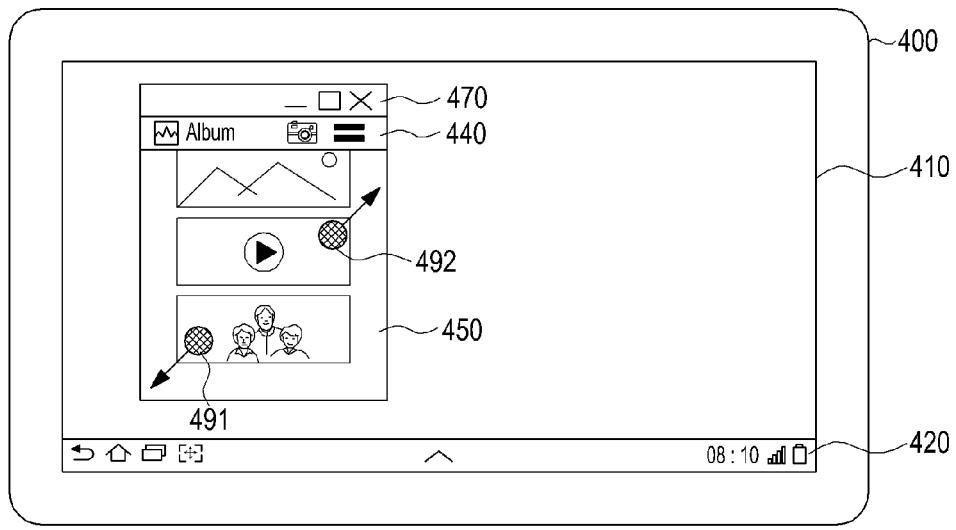

FIG. 10A may be the same as FIG. 4C. For example, it is assumed that the window control mode is being executed.

Figure 10C:
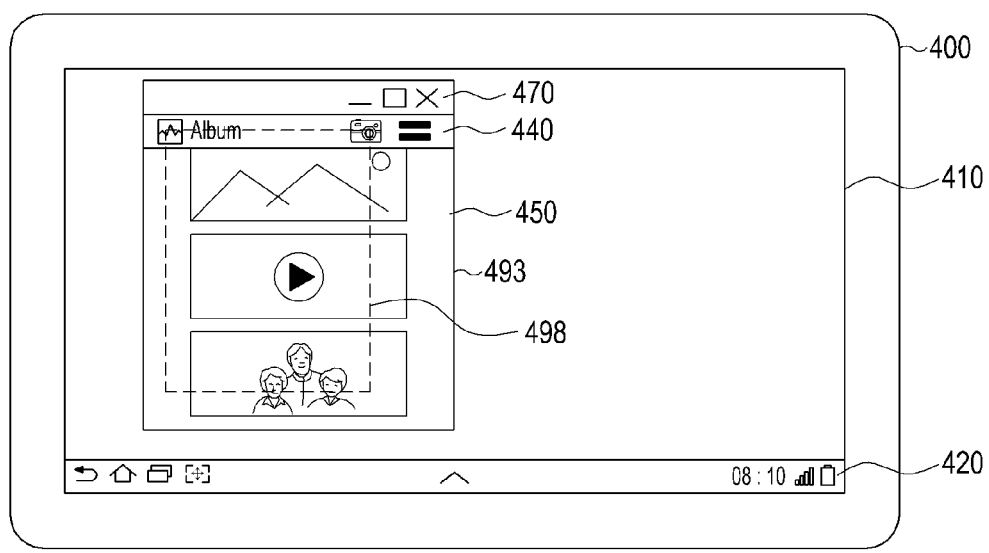

Referring to FIG. 10A through 10E, the user may touch two points on the application execution screen 450. Furthermore, the user may input touches 491 and 492 for the dragging of increasing a distance between the two points. The controller 110 may determine the dragging of increasing the distance between the two points as the window display changing event of enlarging the window size. The controller 110 determines an enlargement magnification of the window size in accordance with the distance between the touches 491 and 492 for the dragging. The controller 110 enlarges 493 the window size based on the determined enlargement magnification as illustrated in FIG. 10C. Furthermore, the controller 110 may display a previous window size by a guide line 498.

Figure 10D:
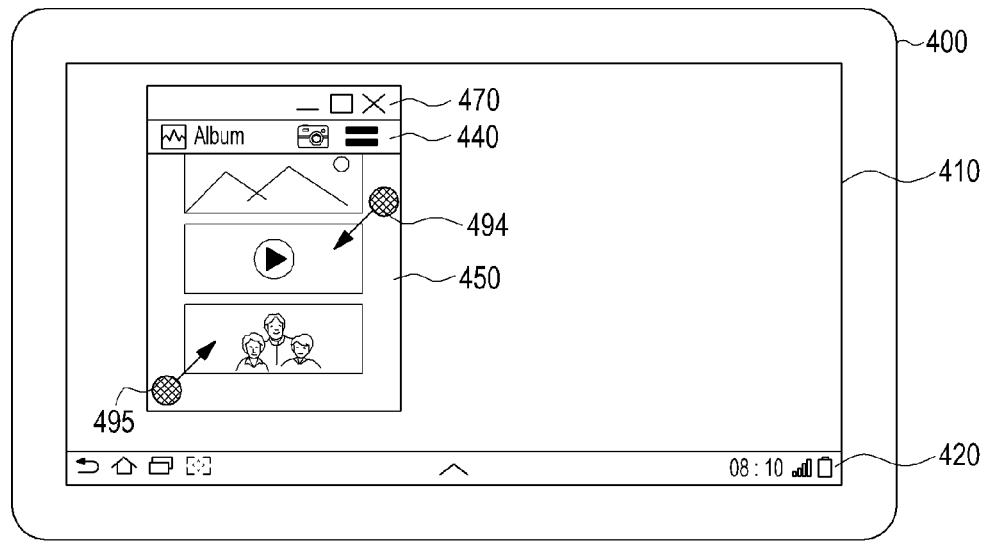
Figure 10E:
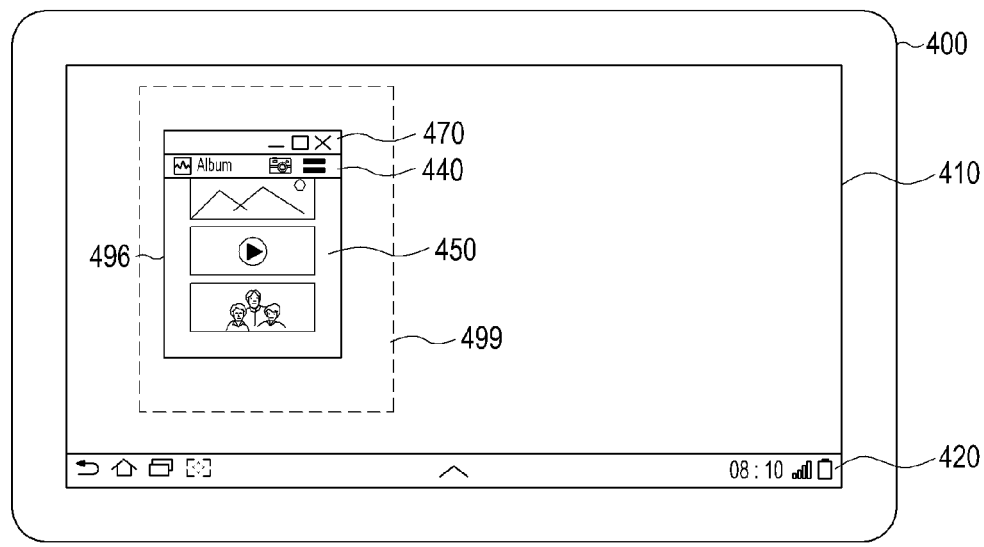

The user may touch two points on the application execution screen 450. Furthermore, the user may input touches 494 and 495, as illustrated in FIG. 10D, for the dragging of decreasing a distance between the touched two points. The controller 110 may determine the dragging of decreasing the two points as the window display changing event of reducing the window size. The controller 110 determines a reduction magnification of the window size in accordance with the distance between the touches 494 and 495 for the dragging. The controller 110 reduces 496 the window size based on the determined reduction magnification as illustrated in FIG. 10E. Furthermore, the controller 110 may display the previous window size by a guide line 499.

FIGS. 11A through 11D illustrate screens for describing a window size change according to an exemplary embodiment of the present invention.

Referring to FIGS. 11A through 11D, the user may touch one point 1101 on the application execution screen 450 and input a dragging in a top direction. The controller 110 may recognize the dragging from the one point 1101 to a top of the application execution screen 450 as a window size reducing event. The controller 110 may control the window such that only a control area 470 is displayed.

Figure 11A:
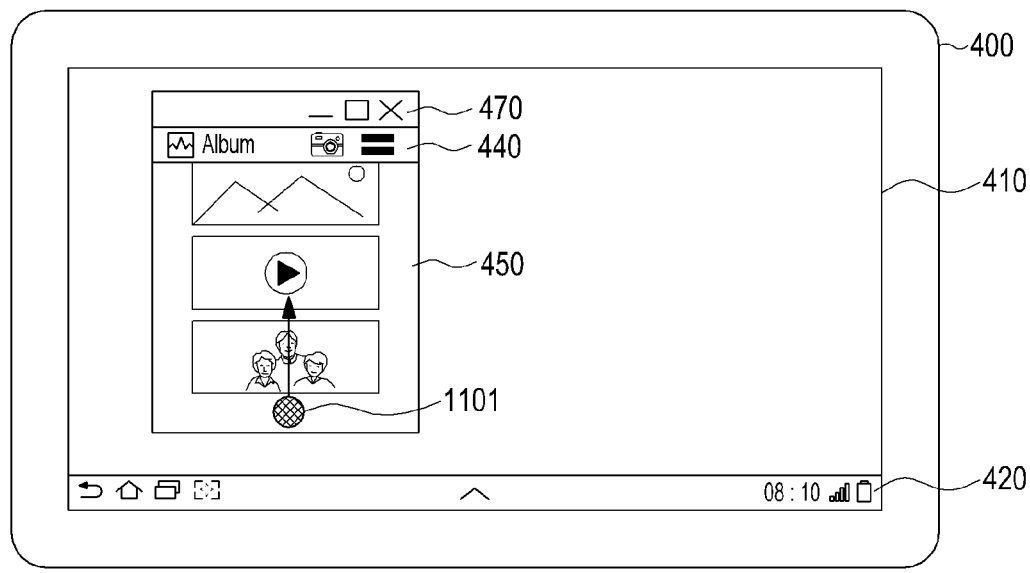
FIGS. 11A through 11D illustrate screens for describing a window size change according to an exemplary embodiment of the present invention.
Figure 11B:
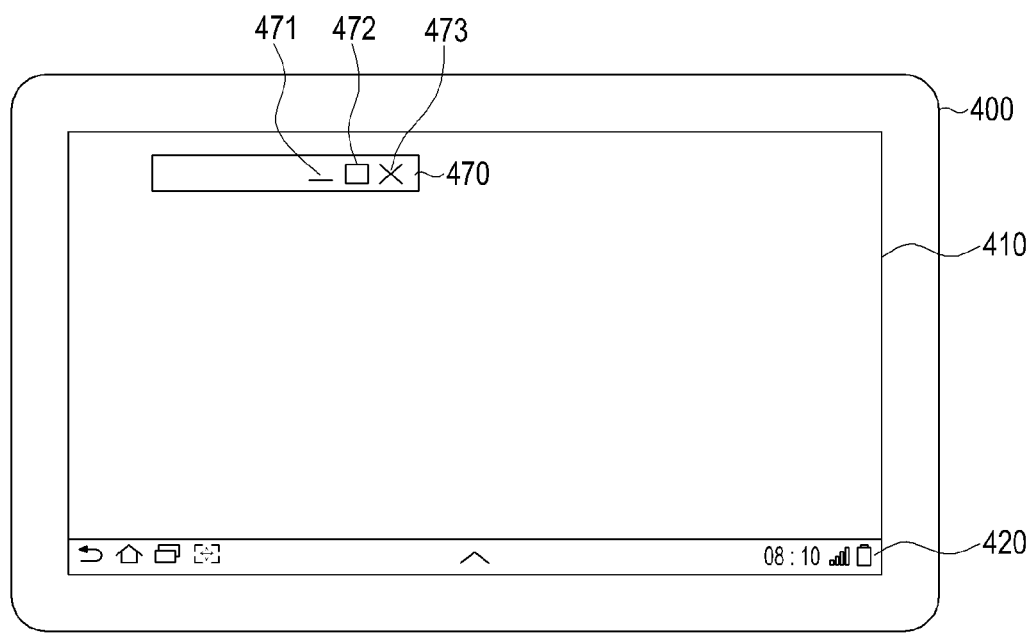
Figure 11C:
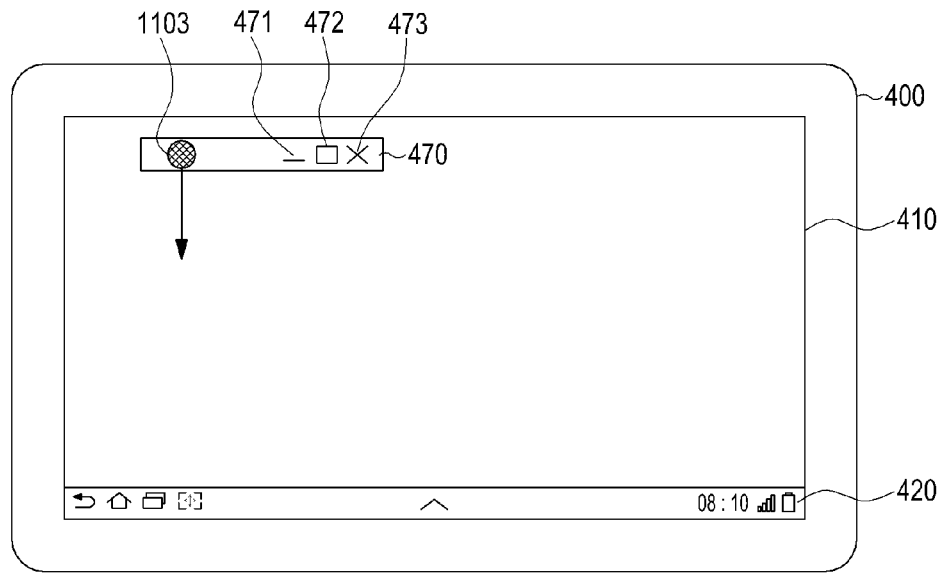
Figure 11D:
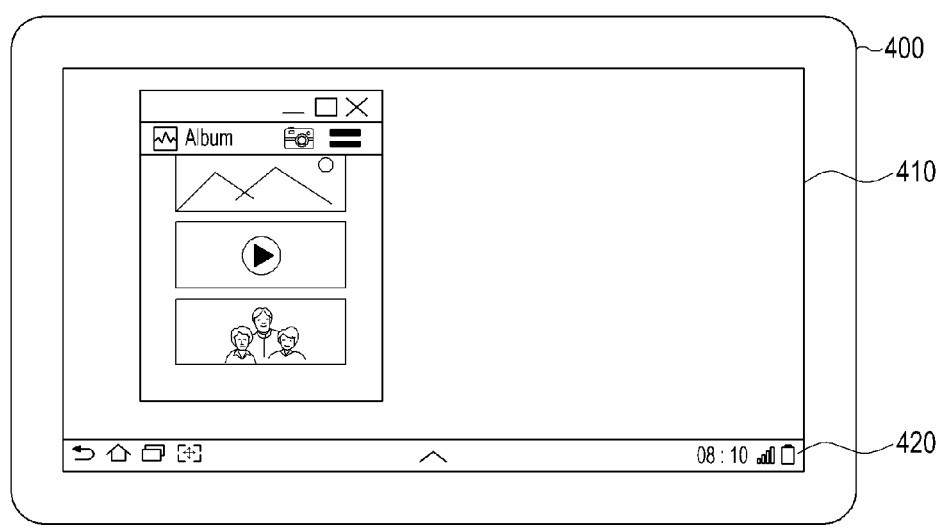

Meanwhile, when only the control area 470 is displayed on the touch screen 410, the user may touch one point 1103 of the control area 470 and input a dragging in a bottom direction. When only the control area 470 is displayed, the controller 110 may recognize the motion of touching the one point of the control area 470 and performing the dragging to the bottom direction a previous window size reconstructing event. When the previous window size reconstructing event is detected, the controller 110 reconstructs the window size to the size before the reduction, that is, the window size illustrated in FIG. 11 and displays the reconstructed window. FIG. 11D illustrates the reconstructed window.

Figure 12A:
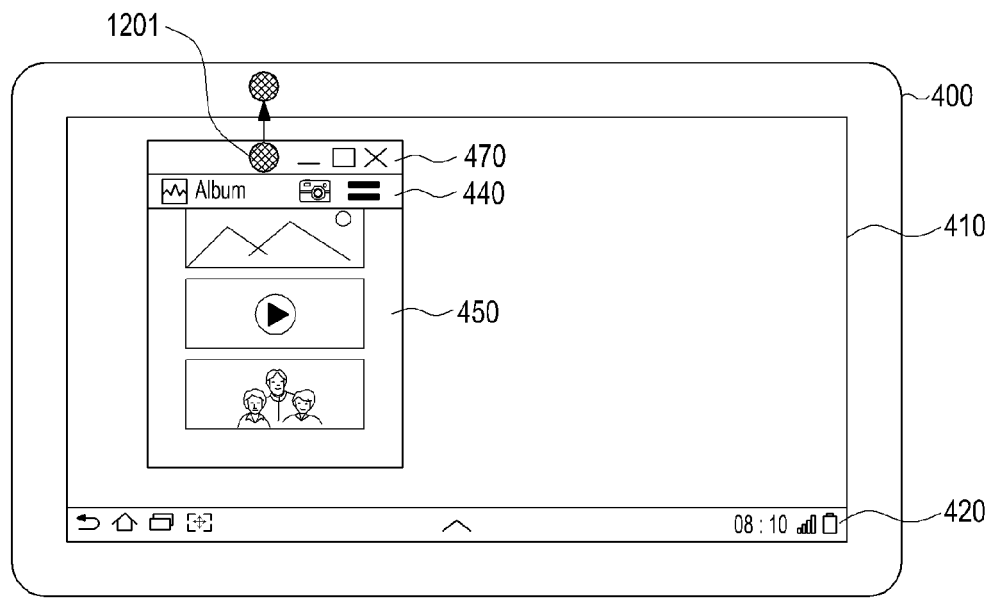
FIGS. 12A and 12B illustrate screens for describing a window size change according to an exemplary embodiment of the present invention.
Figure 12B:
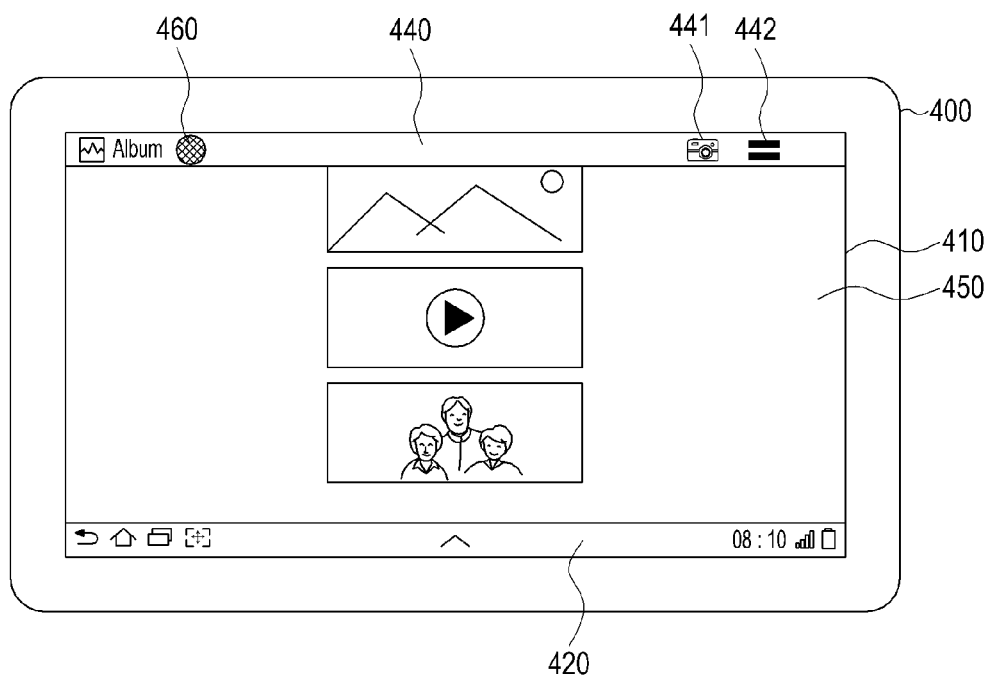

FIGS. 12A and 12B illustrate screens for describing a window size change according to an exemplary embodiment of the present invention.

Referring to FIGS. 12A and 12B, the user may touch one point 1201 of the control area 470 and perform a dragging to the top direction. More specifically, the user may touch the one point 1201 of the control area 470 and perform the dragging until arriving at a top boundary line of the touch screen. The controller 110 may recognize the motion of touching the one point 1201 of the control area 470 and performing the dragging to the top boundary line of the touch screen as a maximum screen display event. The controller 110 may display the application execution screen on the entire screen as illustrated in FIG. 12B. For example, even though the event is input into the control area 470 as illustrated in FIG. 12A, when the dragging up to the boundary line of the touch screen is input, the controller 110 may simultaneously change the window size and the window position and may display the changed window. The above description will be discussed below with reference to FIGS. 13A through 13J.

FIGS. 13A through 13J illustrate screens for describing a window control according to various exemplary embodiments of the present invention.

Figure 13A:
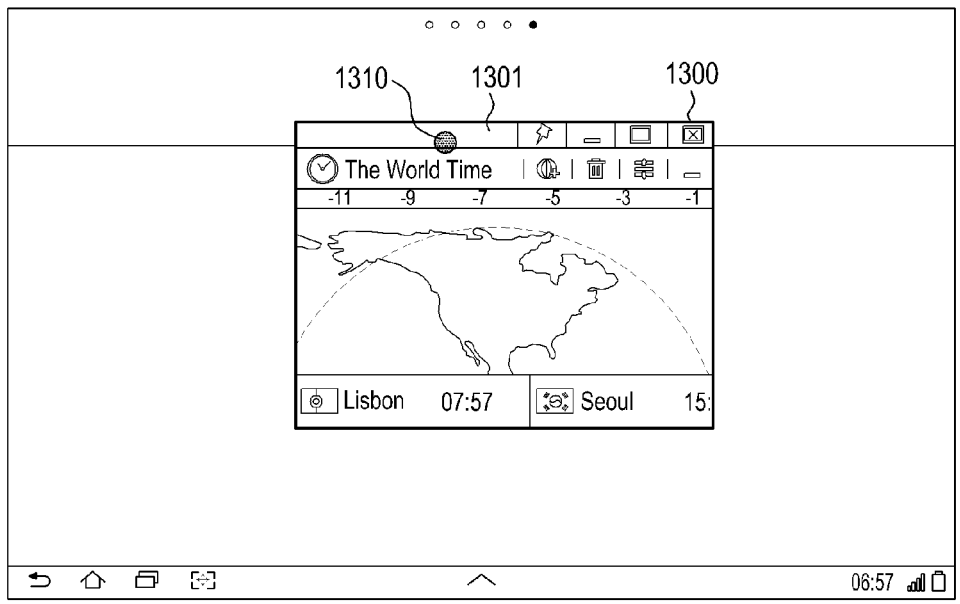
FIGS. 13A through 13J illustrate screens for describing a window control according to various exemplary embodiments of the present invention.

Referring to FIG. 13A, the user performs a touch 1310 on one point in a control area 1301 of a window 1300. It is assumed that FIG. 13A is a screen where a window control mode is already initiated.

Figure 13B:
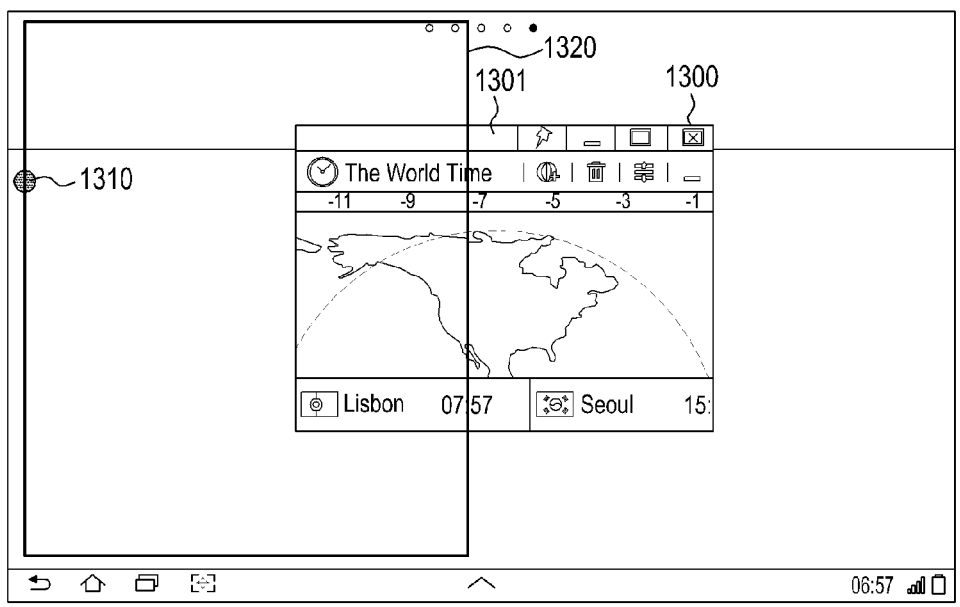

Referring to FIG. 13B, the user may input a dragging 1310 performed from one point of the control area 1301 to a left boundary line of the touch screen. In this case, the controller 110 may recognize an event input into the control area 1301 as an event for simultaneously changing a size and a position of the window. The controller 110 may display a guide line 1320 in accordance with the dragging 1310. The guide line 1320 may be for the size and the position of the window after the display change.

Figure 13C:
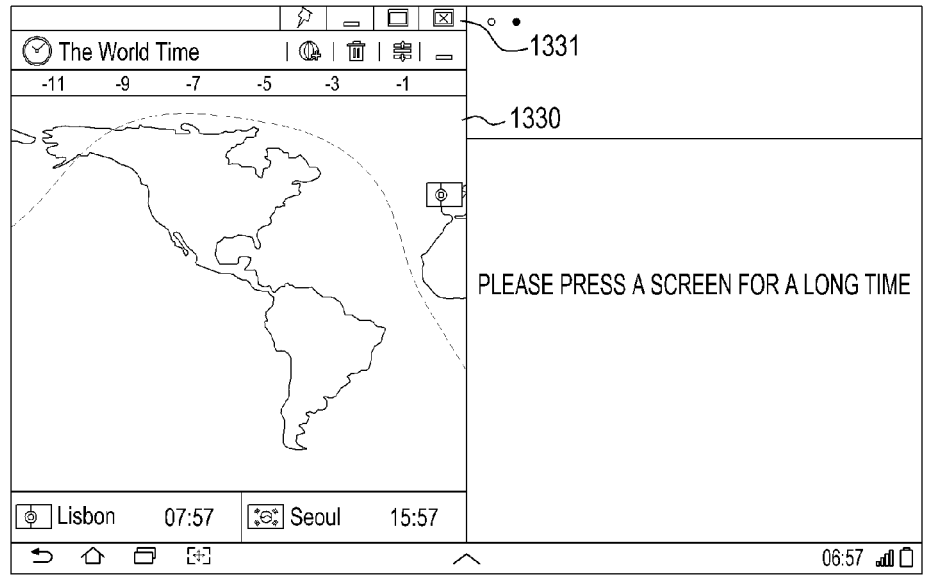

Referring to FIG. 13C, when the user releases the touch 1310, the controller 110 may display a window 1330 having the changed size and position. Here, the dragging performed from the one point of the control area 1301 to the left boundary line of the touch screen may be an event for displaying the window on a left divided screen of the touch screen. Accordingly, the controller 110 may display the window 1330 on the left divided screen of the touch screen.

Figure 13D:
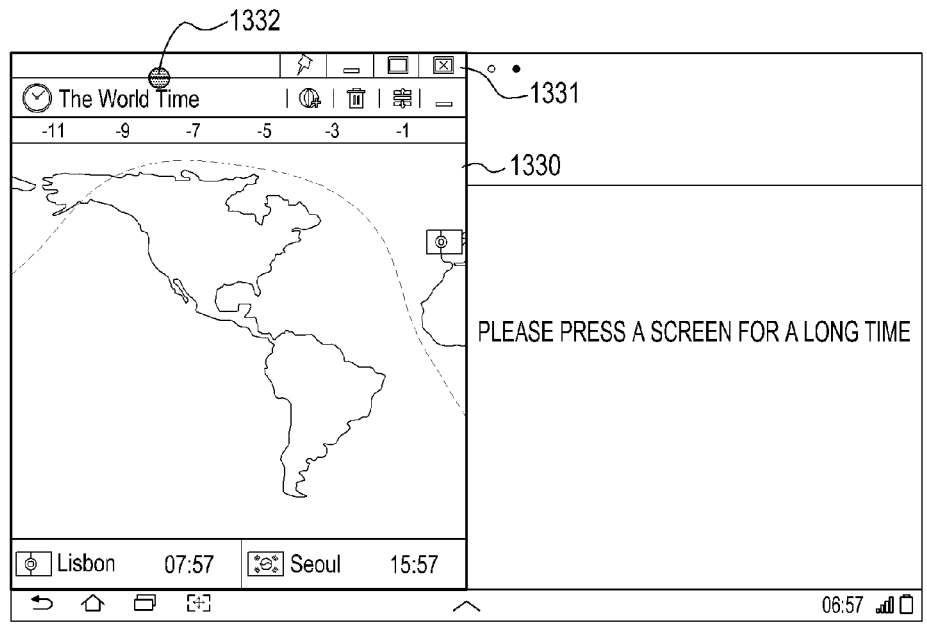

Referring to FIG. 13D, the user may perform a touch 1332 on one point in a control area 1331 of the window 1330.

Figure 13E:
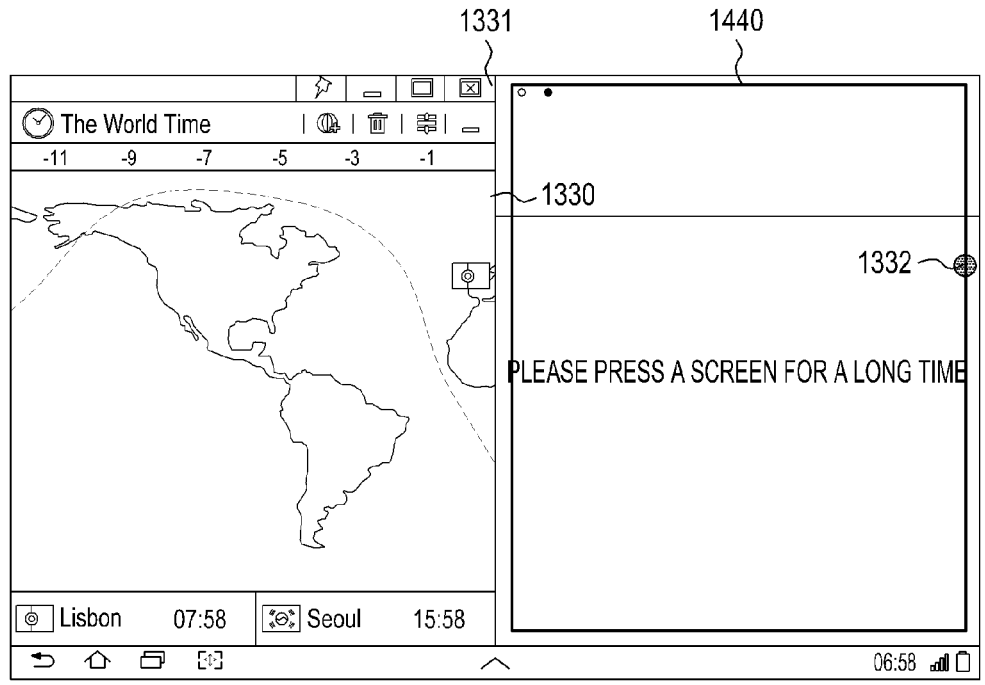

Referring to FIG. 13E, the user may perform a dragging 1332 from the touched point to a right boundary line of the touch screen. In this case, the controller 110 may recognize an event input into the control area 1331 as an event for simultaneously changing the size and the position of the window. The controller 110 may display a guide line 1440 in accordance with the dragging 1332. The guide line 1440 may be for the size and the position of the window after the display change.

Figure 13F:
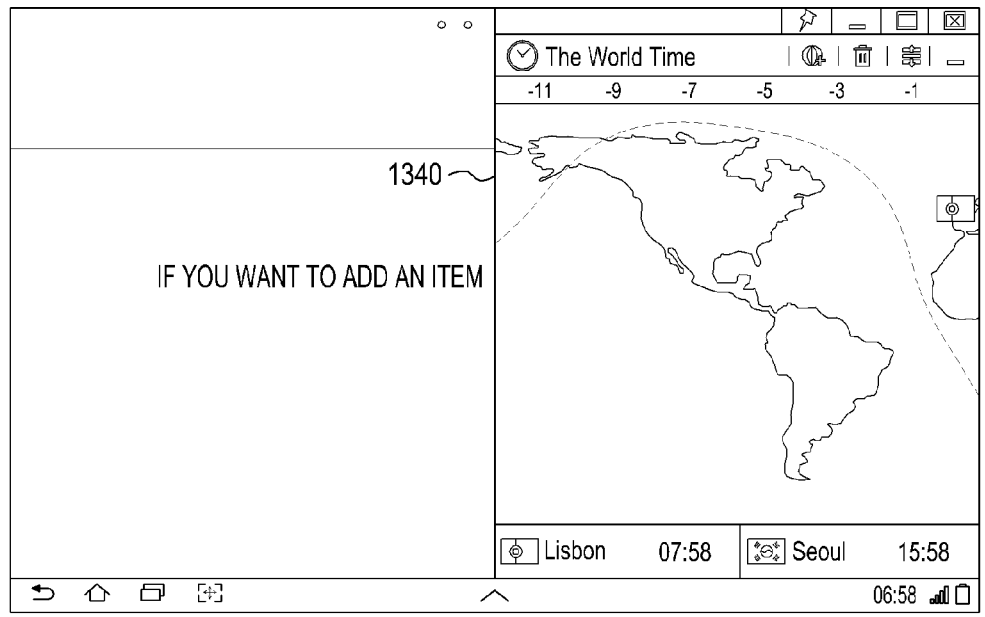

Referring to FIG. 13F, when the user releases the touch 1332, a window 1340 having the changed size and position may be displayed by the controller 110. Here, the dragging performed from the one point of the control area 1331 to the left boundary line of the touch screen may be an event for displaying the window on a right divided screen of the touch screen. Accordingly, the controller 110 may control such that the window 1340 is displayed on the left divided screen of the touch screen.

Figure 13G:
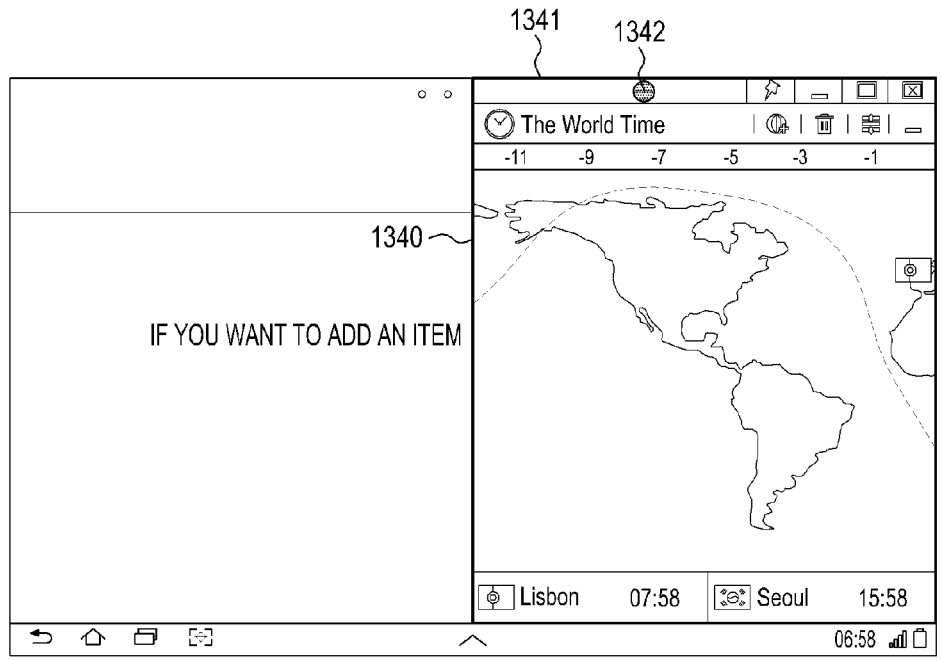

Referring to FIG. 13G, the user may perform a touch 1342 on one point in a control area 1341. Since an event is input into the control area 1341, the controller 110 may recognize the event as a position changing event.

Figure 13H:
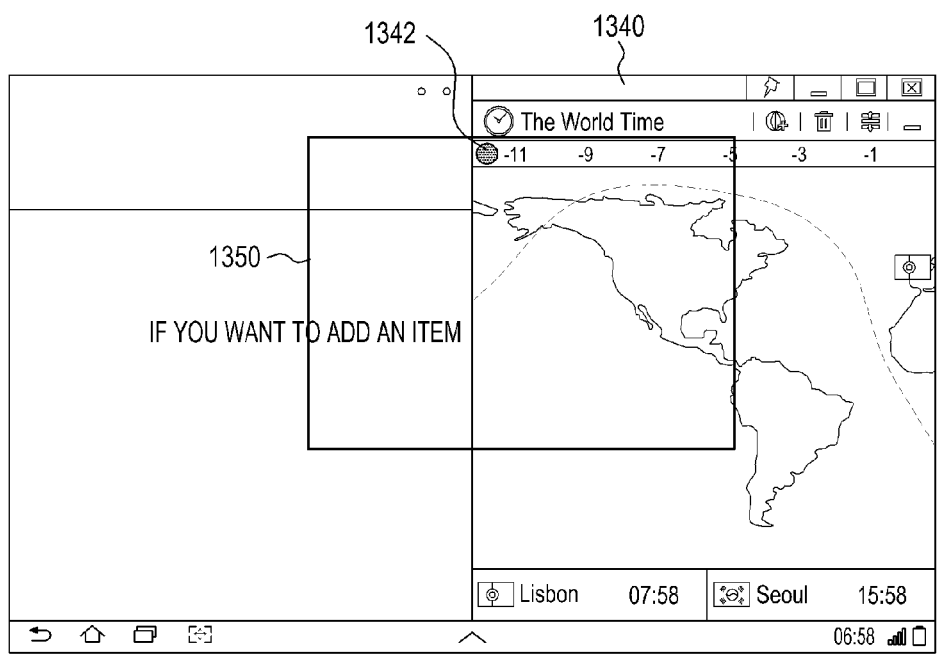

Referring to FIG. 13H, the user may input a dragging 1342 from one point of the control area 1341 to a random point of the touch screen. In this case, the controller 110 may reduce the size of the window 1340 and simultaneously display a guide line 1350 reflecting the position determined in accordance with the dragging 1342. When the user releases the touch 1342, the controller 110 may display the window according to the position and the size of the guide line 1350.

Figure 13I:
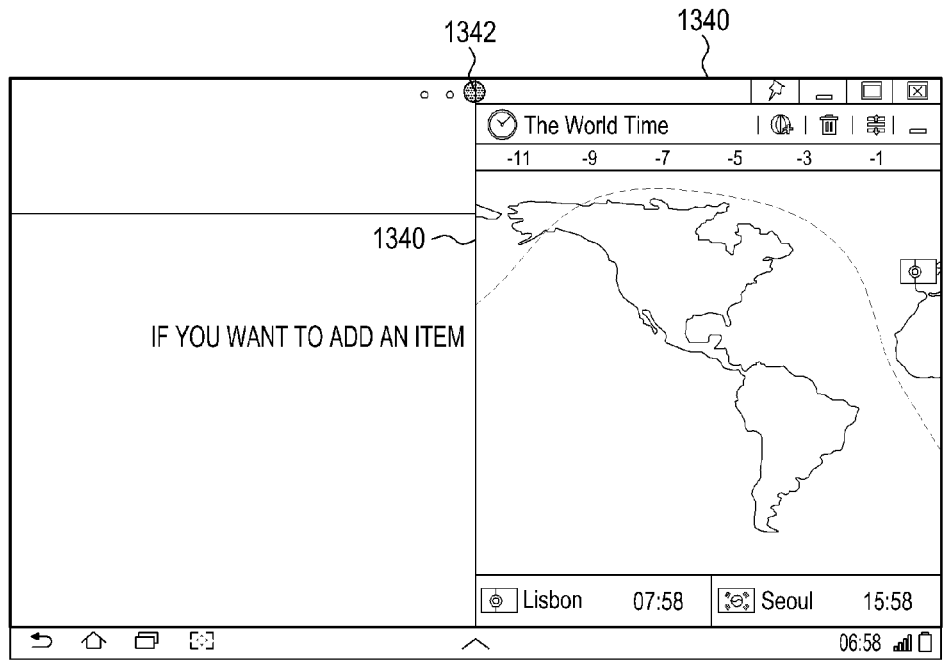

Referring to FIG. 13I, alternatively, the user may input the dragging 1342 up to a top boundary line of the touch screen.

Figure 13J:
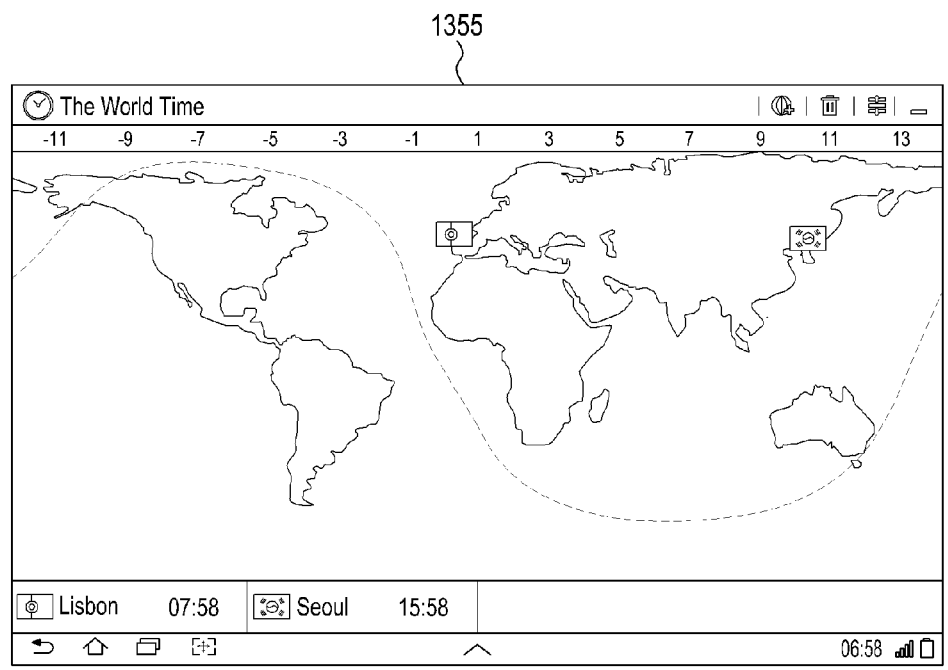

Referring to FIG. 13J, the controller 110 may display a window 1355 on the entire touch screen in accordance with the dragging 1342.

As described above, the user may input the dragging after designating the control area. The controller 110 may recognize the dragging after the control area is designated as the position changing event of the window. However, when the dragging is input up to the left boundary line, the right boundary line, or the top boundary line of the touch screen after the control area is designated, the controller 110 may recognize the dragging as an event for simultaneously changing the size and the position of the window.

Figure 14A:
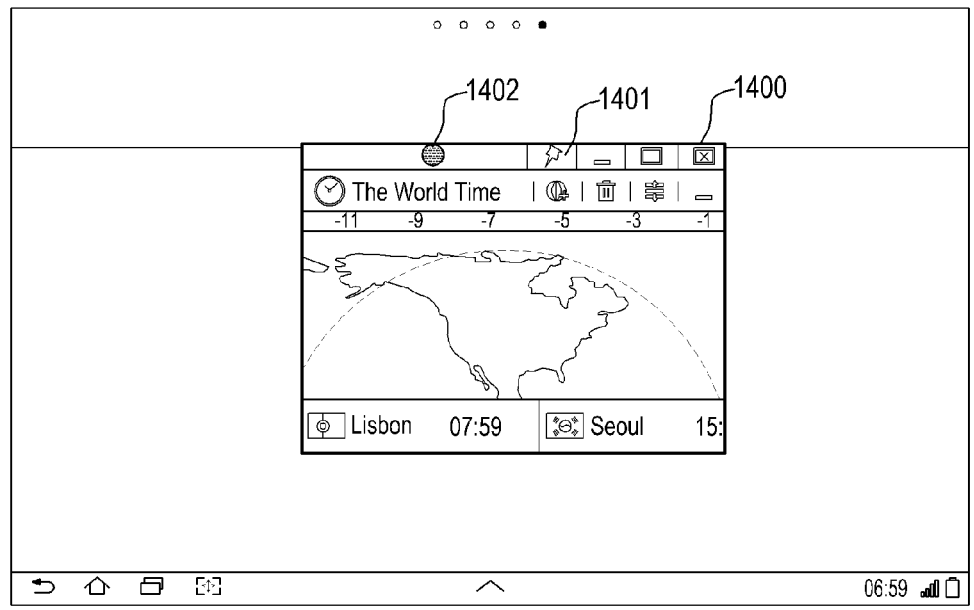
FIGS. 14A through 14C illustrate screens for describing a window control according to an exemplary embodiment of the present invention.
Figure 14B:
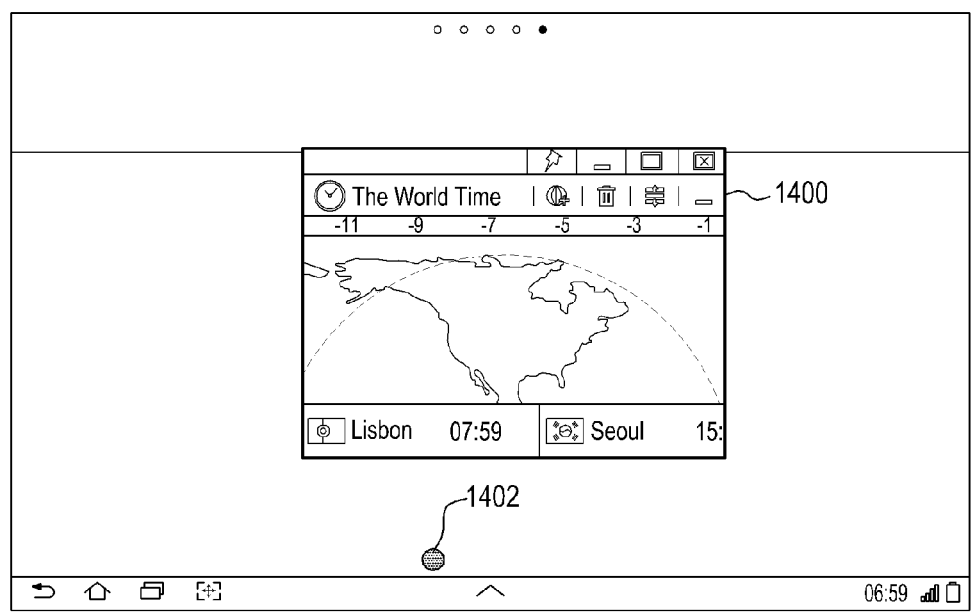
Figure 14C:
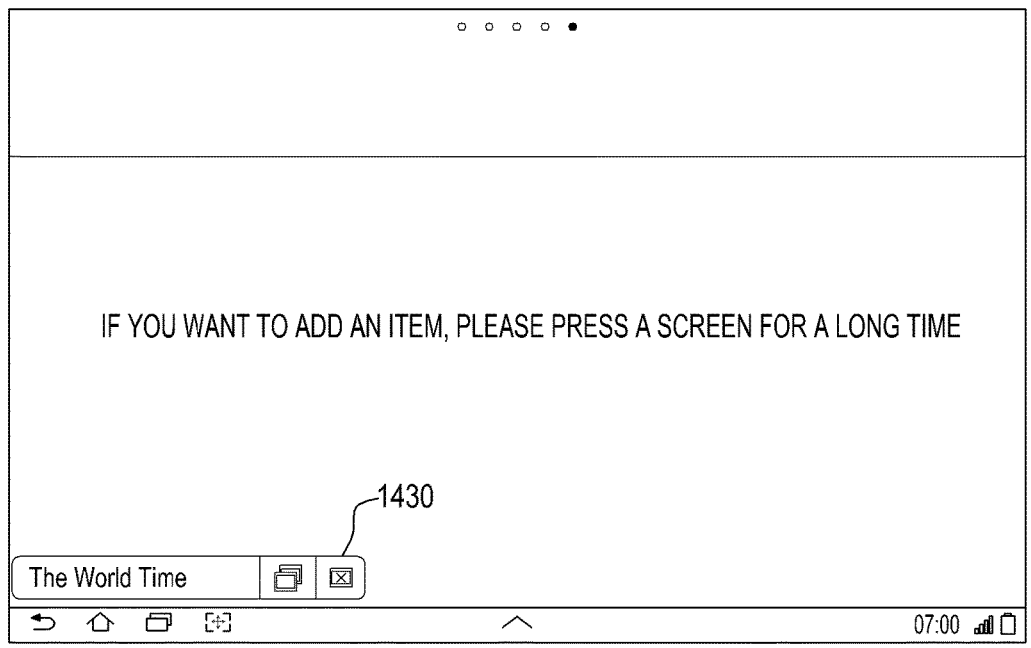

FIGS. 14A through 14C illustrate screens for describing a window control according to an exemplary embodiment of the present invention.

Referring to FIG. 14A, the user may perform a touch 1402 on one point in a control area 1401 of a window 1400.

Referring to FIG. 14B, the user may touch the one point in the control area 1401 of the window 1400 and input a dragging 1402 up to a bottom boundary line of the touch screen. The controller 110 may recognize the dragging performed to the bottom boundary line of the touch screen as an event for simultaneously changing the size and the position of the window.

Referring to FIG. 14C, the controller 110 may display only a control area 1430 in a lower end of the touch screen. For example, an input of the dragging performed to the bottom boundary line of the touch screen after one point of the control area 1401 is designated may be recognized as an event for minimizing a window display. Here, minimizing the window display may mean displaying only the control area 1430 of the window.

Exemplary embodiments of the present invention may be implemented in a form of hardware, software, or a combination thereof. Any such software may be stored, for example, in a volatile or non-volatile storage device, such as a ROM, a memory, such as a RAM, a memory chip, a memory device, or a memory IC, or a recordable optical or magnetic medium, such as a Compact Disc (CD), a Digital Video Disc (DVD), a magnetic disk, or a magnetic tape, regardless of erasability or rewritability. It can also be appreciated that a graphic screen updating method may be implemented by a computer or a portable terminal having a controller and a memory, and the memory is an example of machine-readable devices suitable for storing a program including instructions that are executed by a processor device to thereby implement exemplary embodiments of the present invention. Therefore, exemplary embodiments of the present invention provide a program including codes for implementing a system or method claimed in any claim of the accompanying claims and a machine-readable device for storing such a program. Furthermore, this program may be electronically conveyed through any medium, such as a communication signal transferred via a wired or wireless connection, and exemplary embodiments of the present invention appropriately include equivalents thereto.

Furthermore, the display device may receive the program from a program providing apparatus connected wirelessly or through a wire, and store the received program. The program providing apparatus may include a program including instructions to perform a preset content protecting method by a graphic processing apparatus, a memory for storing information required for the content protecting method, a communication unit for performing wired or wireless communication with the graphic processing apparatus, and a controller for transmitting the corresponding program to a transmitting/receiving apparatus automatically or at a request of the graphic processing apparatus.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
a touch screen configured to display a window and receive touch inputs; and at least one processor configured to:
detect a dragging touch input on the touch screen, the dragging touch input being started from an internal area of the window and released at a first point of the touch screen, adjust, if the window is in a window control mode, a size of the window based on a position of the first point, adjust, if the window is in a window control mode and the dragging touch input is started on a control area of the window, a size of the window and a position of the window based on the dragging touch input, wherein the position of the window is independent on all sides of a prior position of the window and the position of the window is independent of a periphery of a user interface containing the window, and control to display the adjusted window, or if the window is not in a window control mode, provide the dragging touch input to an application corresponding to the window, wherein the at least one processor executes the window control mode if a window control mode execution button located on a title bar is touched, the title bar being in an area distinct from the control area, wherein the control area is displayed above the title bar in the window control mode, and wherein the at least one processor ends the window control mode if a back button on an area external to the window is selected, the window remaining visible after the selection of the back button.

2. The electronic device of claim 1,
wherein the at least one processor controls such that an event is not provided to the application, if the window is the window control mode.

3. The electronic device of claim 1,
wherein the at least one processor controls to display an execution screen of the application and a title bar for the application on the window.

4. The electronic device of claim 3,
wherein the at least one processor executes the window control mode if the title bar of the window is touched a preset number of times.

5. The electronic device of claim 1,
wherein the at least one processor is configured to detect a direction of the dragging touch input and adjusts the window based on the direction of the dragging touch input and starting point of the dragging touch input.

6. The electronic device of claim 5,
wherein the at least one processor is configured to determine a right direction as an enlargement direction of the window and a left direction as a reduction direction of the window, if the start point of the dragging touch input is a right screen of the window, and determines a left direction as the enlargement direction of the window and a right direction as the reduction direction of the window, if the start point of the dragging touch input is a left screen of the window.

7. The electronic device of claim 5,
wherein the at least one processor is configured to determine whether to enlarge or reduce the window based on the detected direction of the dragging touch input and displays the enlarged or reduced window.

8. The electronic device of claim 7,
wherein the at least one processor is configured to determine to:
enlarge the window when the direction of the dragging touch input is an external direction of the window, and
reduce the window when the direction of the dragging touch input is an internal direction of the window.

9. The electronic device of claim 1,
wherein the at least one processor determines adjustment magnification of the window based on the detected distance of the dragging touch input.

10. The electronic device of claim 1,
wherein the at least one processor detects two touch points, enlarges the window if the dragging touch input increases a distance between the two points, and reduces the window if the dragging touch input decreases the distance between the two points.

11. A controlling method of an electronic device which comprises a touch screen, the method comprising:
displaying a window;
detecting a dragging touch input on the touch screen, the dragging touch input being started from an internal area of the window and released at a first point of the touch screen;
adjusting, if the window is in a window control mode, the size of the window based on to a position of the first point, and displaying the adjusted window, or if the window is not in a window control mode, provide the dragging touch input to an application corresponding to the window; and
adjusting, if the window is in a window control mode and the dragging touch input is started on a control area of the window, a size of the window and a position of the window based on the dragging touch input, wherein the position of the window is independent on all sides of a prior position of the window and the position of the window is independent of a periphery of a user interface containing the window,
wherein the window control mode is executed if a window control mode execution button located on a title bar is touched, the title bar being in an area distinct from the control area, wherein the control area is displayed above the title bar in the window control mode, and
wherein the at least one processor ends the window control mode if a back button on an area external to the window is selected, the window remaining visible after the selection of the back button.

12. The method of claim 11,
wherein an event is not provided to the application, if the window is a window control mode.

13. The method of claim 11, further comprising:
displaying an execution screen of the application and a title bar for the application on the window.

14. The method of claim 13, further comprising:
executing the window control mode if the title bar of the window is touched a preset number of times.

15. The method of claim 11, further comprising:
detecting a direction of the dragging touch input and adjusts the window based on the direction of the dragging touch input and starting point of the dragging touch input.

16. The method of claim 15, further comprising:
determining a right direction as an enlargement direction of the window and a left direction as a reduction direction of the window, if the start point of the dragging touch input is a right screen of the window; and
determining a left direction as the enlargement direction of the window and a right direction as the reduction direction of the window, if the start point of the dragging touch input is a left screen of the window.

17. The method of claim 15, further comprising:
determining whether to enlarge or reduce the window based on the detected direction of the dragging touch input and displaying the enlarged or reduced window.

18. The method of claim 17, further comprising:
determining to enlarge the window when the direction of the dragging touch input is an external direction of the window; and
determining to reduce the window when the direction of the dragging touch input is an internal direction of the window.

19. The method of claim 11, further comprising:
determining adjustment magnification of the window based on the detected distance of the dragging touch input.

20. The method of claim 11,
wherein the detecting the dragging touch input on the touch screen comprises detecting two touch points,
wherein the adjusting the size of the window comprises enlarging the window if the dragging touch input increases a distance between the two points, and reducing the window if the dragging touch input decreases the distance between the two points.

\* \* \* \* \*